(12) United States Patent
Duda et al.

(10) Patent No.: US 11,567,933 B2
(45) Date of Patent: Jan. 31, 2023

(54) PATHNAMES WITH EMBEDDED QUERIES

(71) Applicant: Arista Networks, Inc., Santa Clara, CA (US)

(72) Inventors: Kenneth Duda, Santa Clara, CA (US); Ryan Madsen, Santa Clara, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 287 days.

(21) Appl. No.: 16/845,411

(22) Filed: Apr. 10, 2020

(65) Prior Publication Data

US 2021/0319015 A1    Oct. 14, 2021

(51) Int. Cl.
*G06F 16/245* (2019.01)
*G06F 16/242* (2019.01)
*G06F 16/23* (2019.01)
*G06F 16/901* (2019.01)

(52) U.S. Cl.
CPC ............ *G06F 16/245* (2019.01); *G06F 16/23* (2019.01); *G06F 16/244* (2019.01); *G06F 16/9027* (2019.01)

(58) Field of Classification Search
None
See application file for complete search history.

(56) References Cited

U.S. PATENT DOCUMENTS

2011/0225273 A1* 9/2011 Fong ................... H04L 41/0843 709/221
2016/0373292 A1* 12/2016 Sigoure ................ H04L 41/046
2018/0181581 A1* 6/2018 Condict .................. G06F 16/13

* cited by examiner

*Primary Examiner* — Scott A. Waldron
(74) *Attorney, Agent, or Firm* — Fountainhead Law Group P.C.

(57) ABSTRACT

In one embodiment, a method includes receiving, at a network management system (NMS) from a client, a message having an object reference embedding a query, the query requesting an operation to be performed on data stored in a data tree maintained by the NMS. The method provides for generating, by the NMS, a result of the query by performing the operation on the data. In this embodiment, the method further provides for sending, by the NMS to the client, the result of the query. In some embodiments, the object reference may include a pathname.

28 Claims, 15 Drawing Sheets

PATHNAMES WITH EMBEDDED QUERIES

BACKGROUND

The present disclosure relates to computer networking, and more particularly, to network management interfaces and protocols.

Network management systems (NMSs) can collect data such as state change from a multitude of network elements such as switches. This data may be stored in a database maintained by the NMS, which may be organized or structured as a data tree. As such, clients of the NMS may access data stored on the NMS using network management protocols by specifying a pathname corresponding to the node in the data tree that is to be accessed. These pathnames typically include an ordered list of pathname elements, each of which correspond to a node in the data tree. The ordered list of pathname elements is able to uniquely identify a particular node in the data tree. A value associated with the node that the pathname identifies can be stored at the end of the pathname.

SUMMARY

In one embodiment, the present disclosure pertains to processing and responding to queries that are embedded in object references. In some embodiments, the object references can be expressed as pathnames. In one embodiment, a computer-implemented method includes receiving, at a subscription handler of a network management system (NMS) from a client, a message having a pathname that encodes a query, the query requesting an operation to be performed on a value associated with a first node in a data tree maintained by the NMS. The method further includes forwarding the pathname to a query router. Additionally, the method provides for locating, by the query router, a query processing service for processing the query and forwarding the pathname to the query processing service. Further, the method includes processing the pathname by the query processing service, including: obtaining, via the subscription handler, the value associated with the second node in the data tree and generating a result of the query by performing the operation using at least the value associated with the second node. Moreover, the method includes forwarding, from the query processing service to the query router, the result of the query. Finally, the method provides for sending, from the query router to the client, a response message comprising the pathname and the result of the query.

In another embodiment, a method is provided. The method includes receiving, at a network management system (NMS) from a client, a first data tree transport message having a pathname with an embedded query, the query requesting an operation to be performed on data stored in a data tree maintained by the NMS. The method further includes generating, by the NMS, a result of the query by performing the operation on the data. In this embodiment, the method further provides for sending, by the NMS to the client, the pathname and the result of the query in a second data tree transport message.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

A limitation of network management protocols is that they support access to data that must already exist in some form in the data tree (e.g., at a node in the data tree). Such network management protocols do not support requests for information that require some calculation or manipulation or operation on data existing in the data tree. This is because information that requires some calculation, manipulation, or operation on data existing in the data tree does not itself correspond to a particular node in the data tree. As a result, these network management protocols are limited in the data they are able to provide to clients. Embodiments described here improve current network management protocols by enabling queries to be embedded in pathnames used by such network management protocols. These queries may require some calculation, manipulation, or operation on data already existing in a data tree such that the result of the query does not itself exist in the data tree.

Figure 1:
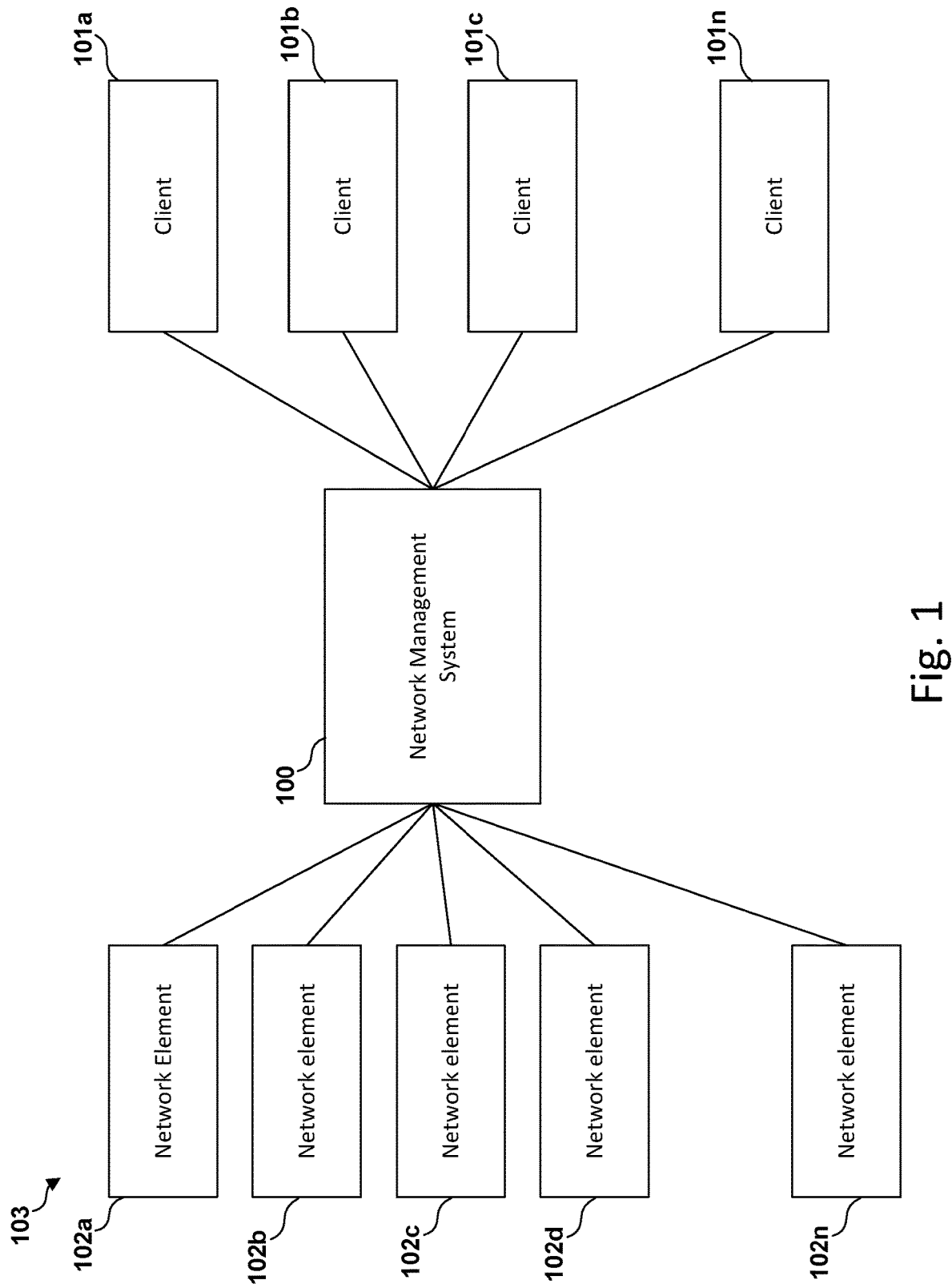
FIG. 1 illustrates a schematic view of an example network management system (NMS), along with a number of network elements that it manages and a number of clients that it serves, according to one embodiment.

FIG. 1 illustrates a schematic view of an example network system 103, including a network management system (NMS) 100 along with a number of network elements 102a-102n that it manages and a number of clients 101a-101n that it serves, according to one embodiment. NMS 100 may communicate with network elements 102a-102n to retrieve state and configuration information from network elements 102a-102n. Additionally, NMS 100 may communicate with network elements 102a-102n to provision configuration for network elements 102a-102n. In certain embodiments, NMS 100 specifies a protocol for communications between the NMS and network elements 102a-102n. For example, the protocol may include a remote procedure call (RPC) that enables NMS 100 to obtain and designate configurations for network elements 102a-102n. The protocol further enables telemetry streams of state information between network elements 102a-102n and NMS 100. For example, the protocol may enable network elements 102a-102n to send updates to NMS 100 based on changes to network elements 102a-102n.

In various embodiments, network elements 102a-102n may include any instance of a communication device, for example, a switch, a router, an access point, a modem, a bridge, a gateway, a firewall, a repeater, a proxy server, or some other computing device used for or capable of communication. NMS 100 may be a distributed system having various computing and storage systems.

In various embodiments, NMS 100 and network elements 102a-102n communicate according to a protocol that enables both the retrieval of state and configuration information for NMS 100 and the provisioning of configuration data for network elements 102a-102n. The protocol may include update messages to facilitate reporting of changes in state. For example, one of network elements 102a-102n may send an update message defined by the protocol to NMS 100 when the state of a particular port changes between "up" and "down." The protocol may include configuration messages to facilitate configuring network elements 102a-102n. For example, NMS 100 may send a message defined by the protocol to network elements 102a-102n to implement a routing policy. The messages defined by the protocol carry payloads having data that has a structure that may be represented by a data tree and values that may be serialized into a scalar object. In some embodiments, each node in the data tree may be addressed by a pathname having an ordered list of pathname elements. In these embodiments, a preceding pathname element within the ordered list is a parent node of a succeeding pathname element within the ordered list, the succeeding pathname elements being a child node. Each pathname element may comprise a node name that identifies a particular node in the data tree, or a node name with an attribute or key that also identifies a particular node in the data tree. Any values carried by a message may be serialized into a scalar object by encoding the value as a JavaScript Object Notation (JSON) string or through some other serialization method. The messages within the protocol definition may be referred to as protocol buffers.

In various embodiments, network elements 102a-102n may maintain state information in a data tree that is defined by certain data schemas. NMS 100 may request state information from the data tree by sending a GET request or a SUBSCRIBE request to network elements 102a-102n having a pathname that uniquely identifies the instances of data in the data tree desired. In response, network elements 102a-102n may send a GET response or a SUBSCRIBE response to NMS 100 containing the specified pathname and the data instances specified by the pathname.

Network elements 102a-102n may send update messages to NMS 100 when some condition is satisfied. In various embodiments, these conditions may include the passing of some time interval, the receipt of a polling message, or the occurrence of some change to a subscribed data instance. The mode of updating may be specified in the subscribe request, for example. When the condition occurs, network elements 102a-102n send a message having the pathname and the updated value to NMS 100. These messages enable network elements 102a-102n to stream telemetry to NMS 100 such that NMS 100 always has a current state of network elements 102a-102n under management.

In various embodiments, NMS 100 may maintain state information as received from network elements 102a-102n in a database that is structured as a data tree. The data tree maintained by NMS 100 may be organized in a manner that reflects the arrangement of network elements 102a-102n in the network system 103. Clients 101a-101n may access data instances of the data tree using the same protocol that is used by NMS 100 and network elements 102a-102n for streaming telemetry. For example, clients 101a-101n may send a GET request or subscribe request to NMS 100 to obtain and subscribe to, respectively, data instances of the data tree maintained by NMS 100. The requests specify an object reference that identifies the data instances within the data tree of NMS 100. In response, NMS 100 communicates a GET response or a subscribe response with the specified object reference and the data instances that the object reference identifies to clients 101a-101n. Furthermore, as NMS 100 gets updates from network elements 102a-102n, NMS 100 may update clients 101a-101n if the clients 101a-101n have subscribed to nodes that are updated.

Embodiments described herein provide the capability for clients 101a-101n to query NMS 100, for example, by embedding query semantics within object references. An object reference may be expressed in any suitable representation that can be used to identify and access an object within an object store. As will be discussed below, for example, in some embodiments an object reference may be a pathname that identifies objects in a hierarchical object store. The pathname may comprise a series of string elements separated by delimiters such as slash characters, periods, etc. In other embodiments, an object reference may comprise a series of numerical elements, each element being separated by a suitable delimiter such as a period, colon, etc. In still other embodiments, the object reference may identify the object in flat address space.

Embodiments described herein further enable NMS 100 to process an object reference that encodes a query and generate a result of the query. Once NMS 100 generates a result of the query, it then communicates the result to one of clients 101a-101n that submitted the query. Additionally, NMS 100 may provide updates to one of clients 101a-101n based on changes to the data used to generate the result of the query. Embodiments described here may employ a single protocol to allow clients 101a-101n to both retrieve state information compiled by NMS 100 and to query NMS 100 for information based on the retrieved state information. That is, protocols described here enable (1) retrieval of state information and (2) the ability to query the NMS using object reference semantics. In some embodiments, for example, NMS 100 is the CloudVision® data management system, developed and sold by Arista Networks, Inc. of Santa Clara, Calif., the applicant and assignee of the present disclosure.

As used herein, a query refers to a request for information that requires some calculation or operation on existing data (e.g., data contained in the data tree maintained by the NMS 100) to produce data (query result) that is not otherwise stored in the data tree. The query may reference one or more existing nodes in the data tree and may also specify some operation to be performed on those one or more existing nodes. For example, the operation may include a difference in configuration operation (e.g., diff), a traffic counting operation, a select operation, a filtering operation, a projection operation, an aggregation operation, a sorting operation, an arithmetic operation (e.g., add, subtract, multiply, divide, etc.), a search operation, a match operation, among others. The object reference that encodes or embeds the query may not actually correspond to an existing node in the data tree. However, embodiments described here make it appear to clients 101a-101n as though the object reference does correspond to a node in the data tree. In these embodiments, the object reference refers to a virtual node.

As described herein, a query may be distinguished from a typical GET request because the query requires some calculation or operation on existing data, whereas a GET request (e.g., a non-query request) is configured to simply obtain data already existing within a node in the data tree. An example of a non-query request (e.g., a GET request) is the request for permissions of a particular user for a particular device. The request is not a query request because the request does not specify some calculation or operation to be performed on existing data. Instead, the request merely asks for data (e.g., permission level) already existing in a node in the data tree. Thus, the path included in the request corresponds to an existing node in the data tree and the request gets the value associated with the node in the data tree. An example of a query is a request for all traffic going through port 80 on switch 82 between times t1 and t2. In this example, the query requests some calculation or operation to be performed, e.g., aggregating all traffic passing through a particular port on a particular device within a specified period of time. As a result, the object reference that embeds such a query does not necessarily correspond to an existing node in the data tree. Instead, the object reference specifies an operation (e.g., aggregate all traffic), a node (e.g., traffic of port 80 of switch 82), and parameters (e.g., t1 and t2). Embodiments described here provide for a data tree transport protocol that enables query requests using the same object reference semantics as non-query requests for data already existing in a data tree.

Figure 2:
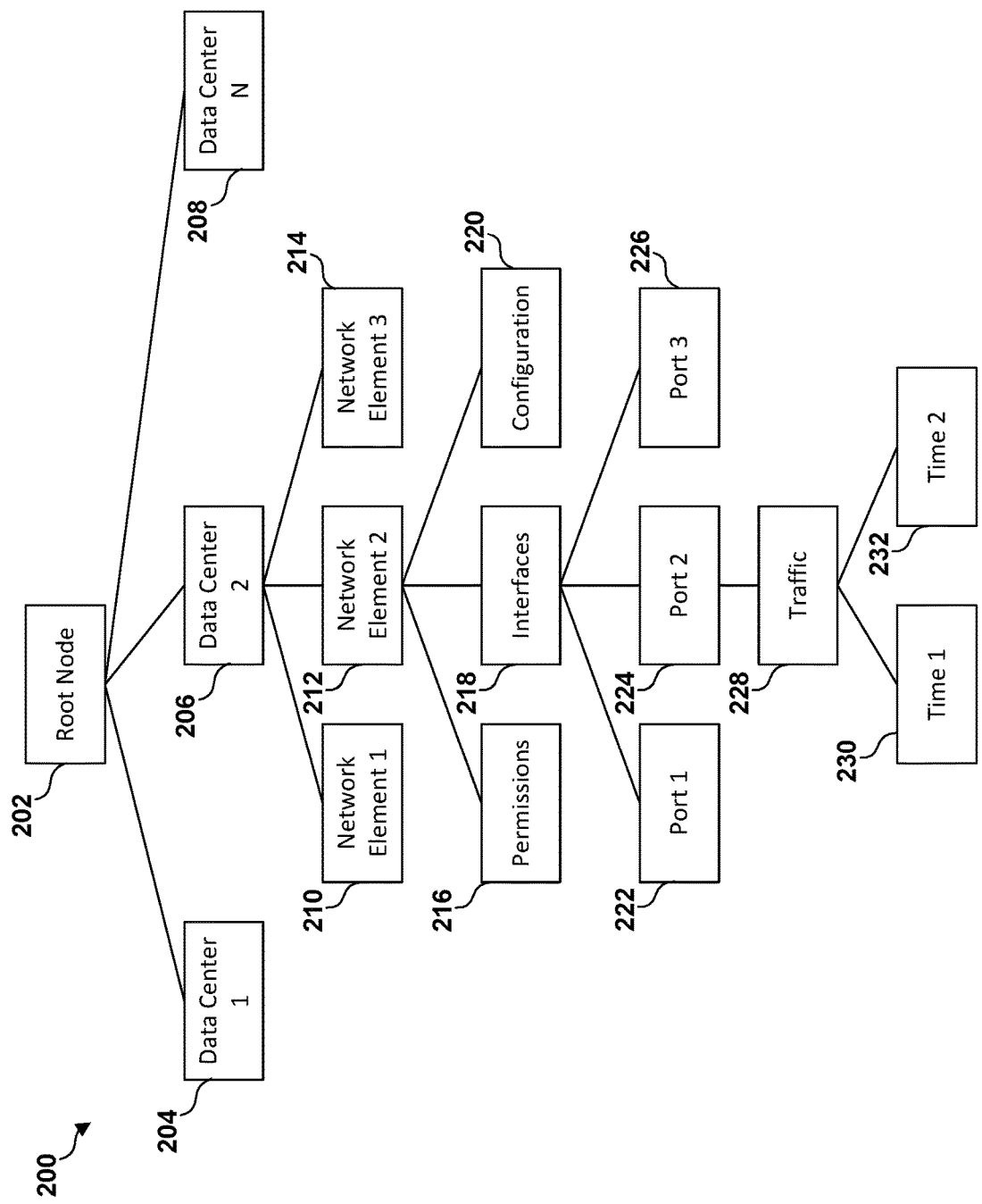
FIG. 2 illustrates an example data tree that may be compiled and maintained by an NMS, according to some embodiments.

FIG. 2 illustrates example data tree 200 that may be compiled and maintained by NMS 100, according to some embodiments. For example, the data held in data tree 200 may be derived from a plurality of network elements organized across a plurality of data centers, for example. NMS 100 may request state information from the plurality of network elements and store the state information in a database that is represented by data tree 200. In the embodiment shown, data tree 200 includes a collection of nodes 202-232 that represent elements in the network system such as network system 103 of FIG. 1. Root node 202, for example, represents the entire network system. Nodes 204, 206, and 208 corresponding to data centers 1-3, respectively, and are child nodes of root node 202. Node 206, in turn, is a parent to child nodes 210, 212, and 214, and so on. Generally, each child node has one parent node, but may have zero, one, or more child nodes.

As noted above, in various embodiments, each node may be addressed by an object reference referred to as a pathname. Each node may be uniquely addressed using a pathname starting with root node 202 and specifying a series of child nodes. The pathname may comprise an ordered list of pathname elements encoded as strings, where a succeeding pathname element is a child node of a preceding pathname element. For example, the pathname /A/B/C/D begins with a root node denoted by "/." The pathname element "A" denotes a child node named "A" of the root node, while the pathname element "B" denotes a child node named "B" of parent node "A," the pathname element "C" denotes a child node named "C" of parent node "B," and the pathname element "D" denotes a child node named "D" of parent node "C." In any given pathname, the concluding pathname element (e.g., pathname element "D") represents the most specific pathname element, for example. In various embodiments, the concluding pathname element corresponds to a leaf node having the data instance that the pathname addresses (e.g., a permission level, a status of a device, or other configuration or operational state).

In various embodiments, a client may wish to view the state of a particular device. The client may provide a GET or SUBSCRIBE message to NMS 100 having a pathname addressing the node that corresponds to the state. For example, if a client seeks to view the traffic going through port 2 of network element 2 of data center 2 at time 1, it may provide a pathname: /data_center_2/network_element_2/interfaces/port_2/traffic/time_1. NMS 100 uses the pathname as an address to read the value associated with the node corresponding to the pathname. In various embodiments, the example pathname may be encoded as:

```
path: {
    element: "data center 2"
    element: "network element 2"
    element: "interfaces"
    element: "port 2"
    element: "traffic"
    element: "time 1"
}
```

In addition to enabling clients to get information from and subscribe to nodes already existing in data tree 200, embodiments described here enable clients to GET (e.g., obtain once) and SUBSCRIBE (e.g., obtain and get recurring updates) to computed results that do not exist in data tree 200. For example, if a client wants to know the total traffic going through port 2 of network element 2 of data center 2, there may be no existing node in data tree 200 that corresponds to such a query. Instead, this query would require some calculation ex post based on data that is stored in the nodes of data tree 200. In particular, the query would require a summation of the values of node 230 (e.g., traffic at time 1) and node 232 (e.g., traffic at time 2) and any other nodes representing traffic between times 1 and 2 (not shown in data tree 200). Advantageously, embodiments described here enable the client to submit such a query using the same protocol that it would to GET and SUBSCRIBE to data already existing in data tree 200. Additionally, some embodiments further enable the client to receive updates to subsequent changes in the query result in the same way that the client can receive updates to subsequent changes to data that are stored in nodes in data tree 200. For example, the client may query NMS 100 of the difference in traffic between ports 1 and 2 of network element 2 of data center 2. NMS 100 may then provide a result of the query to the client and also provide any subsequent updates to the client when the difference between ports 1 and 2 of network element 2 of data center 2 changes.

Figure 3:
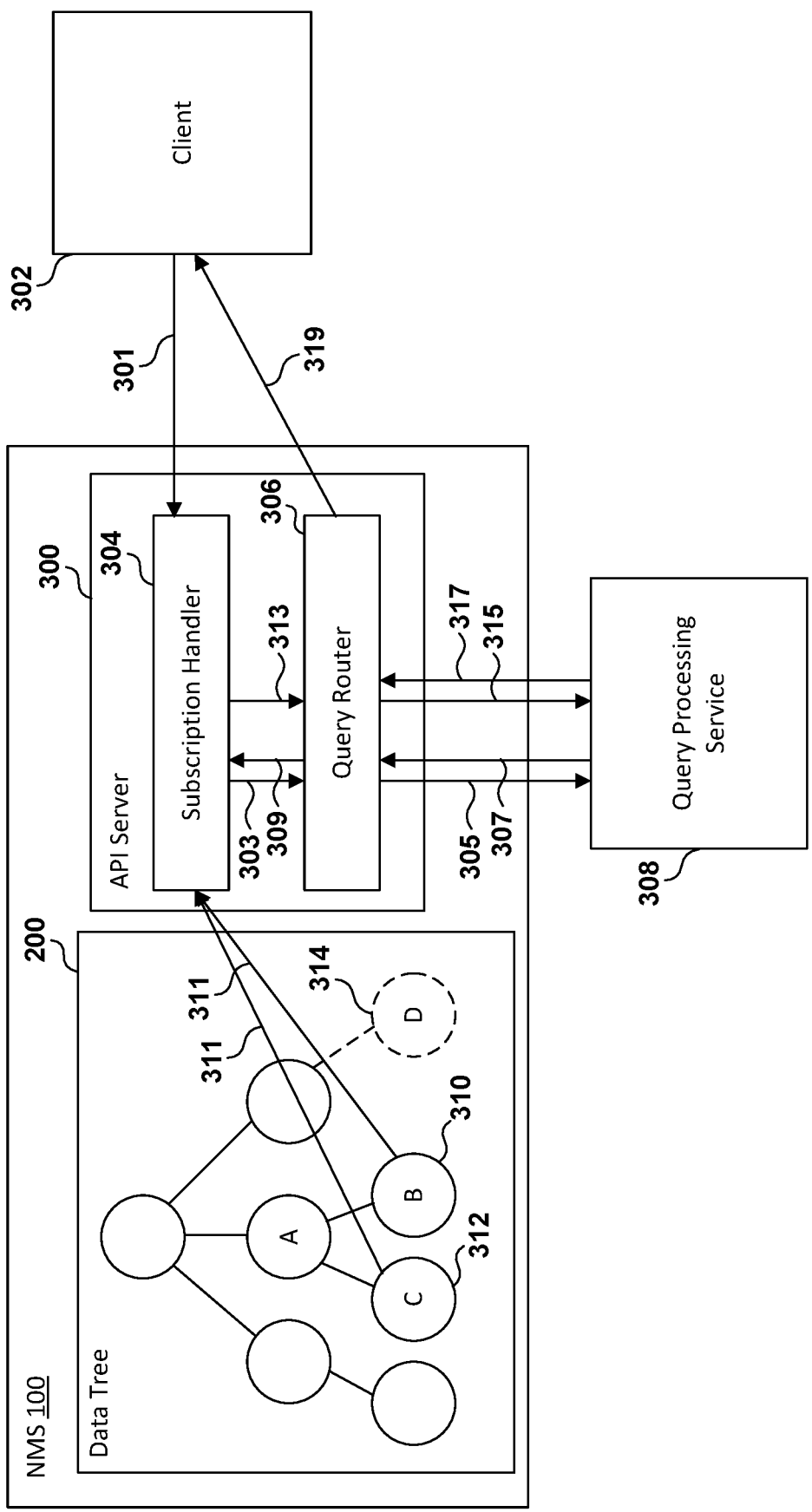
FIG. 3 is a schematic view of an NMS processing and responding to a query embedded within a pathname, according to various embodiments.

FIG. 3 is a schematic view of NMS 100 processing and responding to a query embedded within a pathname, according to various embodiments. NMS 100 is shown to include data tree 200 representing a database holding operational and configuration state of a plurality of network elements (not shown). Data tree 200 may be continually updated by the plurality of network elements. As a result, various nodes in data tree 200 may be updated with updated values. Additionally, nodes may be created anew as, for example, network elements are added to the plurality of network elements.

NMS 100 is also shown to include an application programming interface (API) server 300. API server 300 is shown to interact with client 302, which may be executing an API for retrieving data instances in data tree 200. In various embodiments, client 302 may run an application that accesses and manipulates data in data tree 200. API server 300 provides the interface through which such applications access data of the data tree 200. API server 300 and client 302 may use remote procedure call (RPC) network management interface (gNMI) to communicate.

API server 300 is shown to include subscription handler 304 and query router 306. In some embodiments, subscription handler 304 is responsible for handling incoming GET or SUBSCRIBE requests. For example, communication 301 may include a SUBSCRIBE request message requesting data already existing in data tree 200 (e.g., a non-query request). In that case, the SUBSCRIBE request message includes a pathname that identifies a node existing in data tree 200. For example, if client 302 seeks to view or stream telemetry of the value associated with node B 310, it would specify in the SUBSCRIBE request message the pathname "/A/B." Subscription handler 304 is responsible for reading the value associated with node B 310 directly from the data tree 200 and returning the value to client 302 in a response.

If, on the other hand, the SUBSCRIBE request message (e.g., of communication 301) includes a pathname that embeds a query, the pathname will not correspond to a node already existing in the data tree 200. For example, consider a query that requests some operation to be performed on node B 310 and node C 312, e.g., a difference between node B 310 and node C 312, an average of node B 310 and node C 312, a request for which node is greater, etc. In the example of the difference between node B 310 and node C 312, the pathname embedding this query may be /query/difference/B/C, although numerous other implementations are possible (e.g., /query/difference/C/B, /query/difference/nodes[key=B, C], /query/difference/A/B/A/C, etc.). It can be appreciated that pathnames which embed queries, generally, do not have corresponding nodes in data tree 200 because of the relatively arbitrary nature of queries. For example, it would not be practical to define a node for each possible kind of query that can be made on data tree 200.

In some embodiments, queries may nonetheless be represented by virtual nodes in the data tree. In the embodiment shown, for example, the result of the query is represented by virtual node D 314 drawn in dashed lines. In some embodiments, node D 314 does not exist in data tree 200 but is virtual and can be exposed to client 302 as a real node. That is, while the pathname with the embedded query does not correspond to an existing node in the data tree 200, it is processed by the NMS 100 as a valid pathname that does correspond to an existing node in data tree 200.

In various embodiments, subscription handler 304 is responsible for determining whether the SUBSCRIBE request message embeds a query or not. In the case of a SUBSCRIBE request message with an embedded query, subscription handler 304 forwards the message to query router 306 at flow 303. Query router 306 is responsible for locating a query processing service to process the query. Here, query router 306 locates query processing service 308 and forwards the message or at least the pathname with the embedded query to query processing service 308. Query processing service 308 is responsible for generating a result of the query and communicating the result to the query router 306. Upon receiving the pathname with the embedded query at flow 305, query processing service 308 may parse the pathname into various elements for constructing a query command that is executable by query processing service 308. In the present example, the pathname /query/difference/B/C may be used to construct the query command, which may be: diff B C. The query command may then be processed by the query processing service 308 to find the difference between node B 310 and node C 312.

In the process of constructing the query command, query processing service 308 may also determine the pathnames associated with the nodes required to generate the result of the query. In the present example, query processing service 308 may determine that node B 310 has a corresponding pathname of /A/B and node C 312 has a corresponding pathname of /A/C. In various embodiments, either the pathname with the embedded query or the query command is stored on query processing service 308 so that the query processing service 308 may recalculate the result of the query when a change occurs to data tree 200.

Next, the query processing service 308 gets the values associated with the nodes referenced in the query via the query router 306 and the subscription handler 304. In the present example, the query processing service 308 may send a GET or SUBSCRIBE message at flow 307 to the query router 306 to obtain the values associated with node B 310 and node C 312. The query router 306 is shown to forward the message to the subscription handler 304 at flows 307 and 309 and the subscription handler 304 is shown to read the values associated with node B 310 and node C 312 at flow 311. Additionally, the subscription handler 304 may subscribe the query processing service 308 to node B 310 and node C 312 such that the query processing service 308 is updated when subsequent changes occur to either node B 310 or node C 312. The values associated with node B 310 and node C 312 are sent to the query processing service 308 via flows 313 and 315. The query processing service 308 next performs an operation on the obtained values associated with node B 310 and node C 312 to generate the result of the query. The result of the query is then sent at flow 317 to the query router 306, which then communicates the query result to the client 302 in a SUBSCRIBE response message at communication 319.

Although the pathnames described herein are represented as strings of text, other representational forms are contemplated. For example, a user may submit a pathname to client 302 via a command line interface (CLI) in string format using a pathname representation (e.g., /diff/B/C). In other embodiments, the user may submit a query that either (1) is not in string format and/or (2) does not adhere to pathname conventions. For example, in at least certain embodiments, a user may interact with a graphical user interface (GUI) at client 302 that displays configuration and/or operational state of various network elements in the form of graphs, charts, tables, and other graphical elements. Queries can similarly be generated without requiring the user to specify the query as a pathname. For example, the user may interact with the GUI, for example, by specifying different views and by changing relevant parameters. These actions may cause the application supporting the GUI to generate the queries needed to retrieve information to generate the different views with the relevant parameters.

As described above, in some embodiments, pathnames are provided to query processing service 308 in the form of human-readable strings. It will be appreciated that in other embodiments, pathnames need not be in a human-readable format but can be provided to query processing service 308 in any suitable format. In some embodiments, for example, pathnames can be expressed in a machine-readable binary format, in a symbolic representation, and so on.

Figure 4:
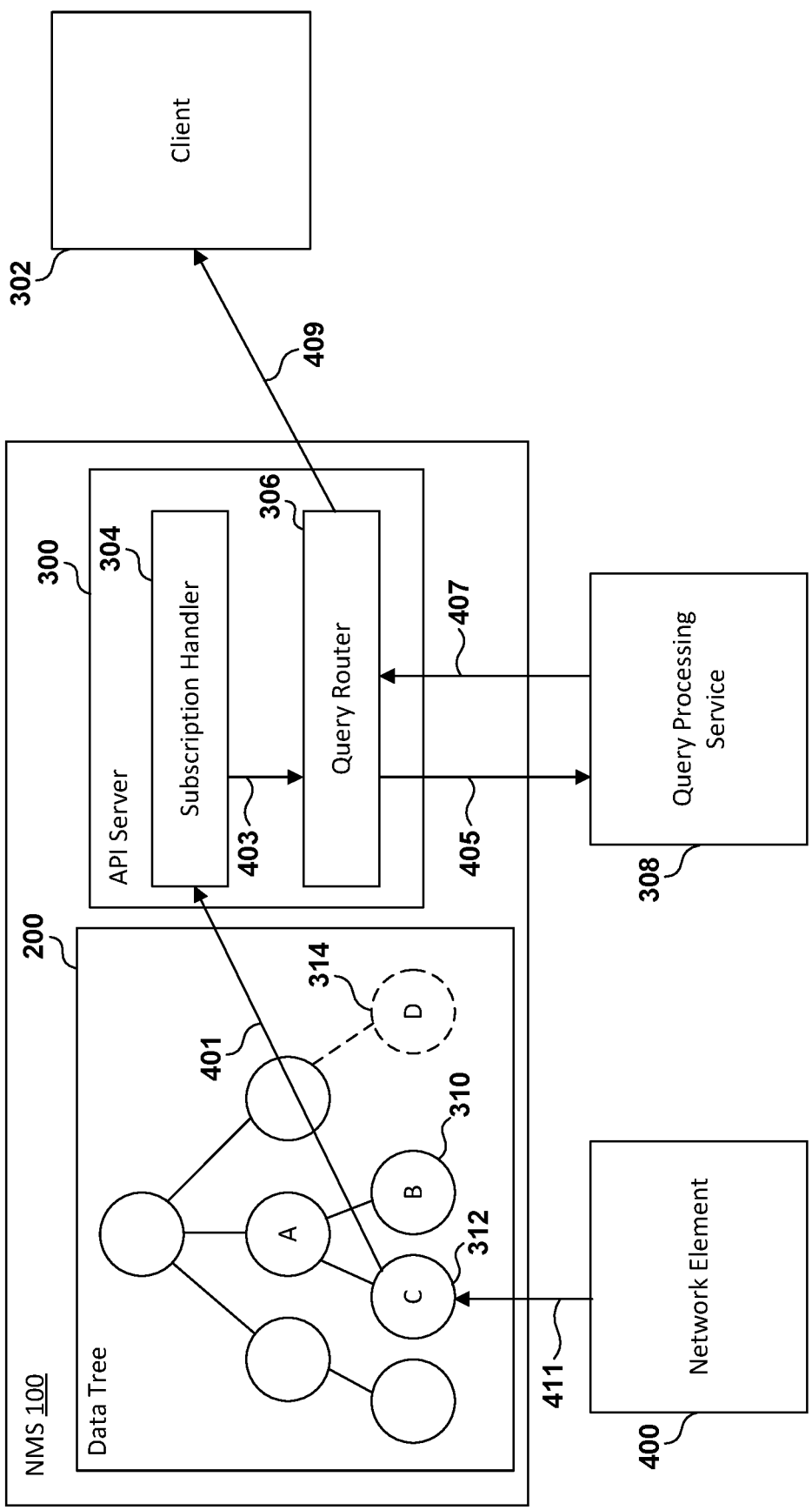
FIG. 4 is a schematic view of an NMS providing the client with an update to the result of the query based on changes to the data tree, according to various embodiments.

FIG. 4 is a schematic view of NMS 100 providing client 302 with an update to the result of the query based on a change to data tree 200, according to various embodiments. In the embodiment shown, node C 312 represents configuration or operation state information of network element 400 (e.g., traffic). The network element 400 updates NMS 100 of state change information at flow 411. NMS 100 in turn updates the value of node C 312 in data tree 200, for example. In certain embodiments, if clients are subscribed to node C 312, subscription handler 304 may send an update message to those clients notifying them of the updated value of node C 312. Here, query processing service 308 is subscribed to node C 312 via subscription handler 304. Thus, when node C 312 is updated to an updated value, the subscription handler 304 reads the updated value at flow 401 and communicates the updated value in an update message to the query processing service 308 at flows 403 and 405 via query router 306.

In certain embodiments, when the updated value is received by query processing service 308, the query processing service recalculates the result of the query by executing the query command using the updated value associated with node C 312. In various embodiments, this recalculation generates an updated result of the query. In some embodiments, query processing service 308 stores the values associated with the nodes referenced by the query (e.g., node B 310 and node C 312). As a result, query processing service 308 writes the updated value of node C 312 to local memory. Additionally, because the query processing service 308 has written the value associated with node B 310, it does not need to get the value associated with node B 310 to perform the recalculation of the result of the query.

In certain embodiments, the updated result of the query is communicated at flow 407 to query router 306, which then sends an update message to the client at communication 409. In various embodiments, the update message includes the pathname as specified in the subscribe message along with the updated result of the query.

In the embodiments of FIGS. 3 and 4, the result and the updated result of the query do not persist in the data tree 200. For example, node D 314 is not created by NMS 100 and the result of the query is not stored by data tree 200. Instead, the result of the query may persist in query processing service 308. In this case, if client 302 or some other client queries NMS 100 with the same pathname (e.g., /query/difference/A/B) or a different pathname corresponding to the same query (e.g., /query/difference/nodes[A, B]), the result of the query as persisted on the query processing service 308 may be returned to the requesting client. In other embodiments, however, the result of the query does not persist in either NMS 100 or query processing service 308 and is generated on-demand.

Figure 5:
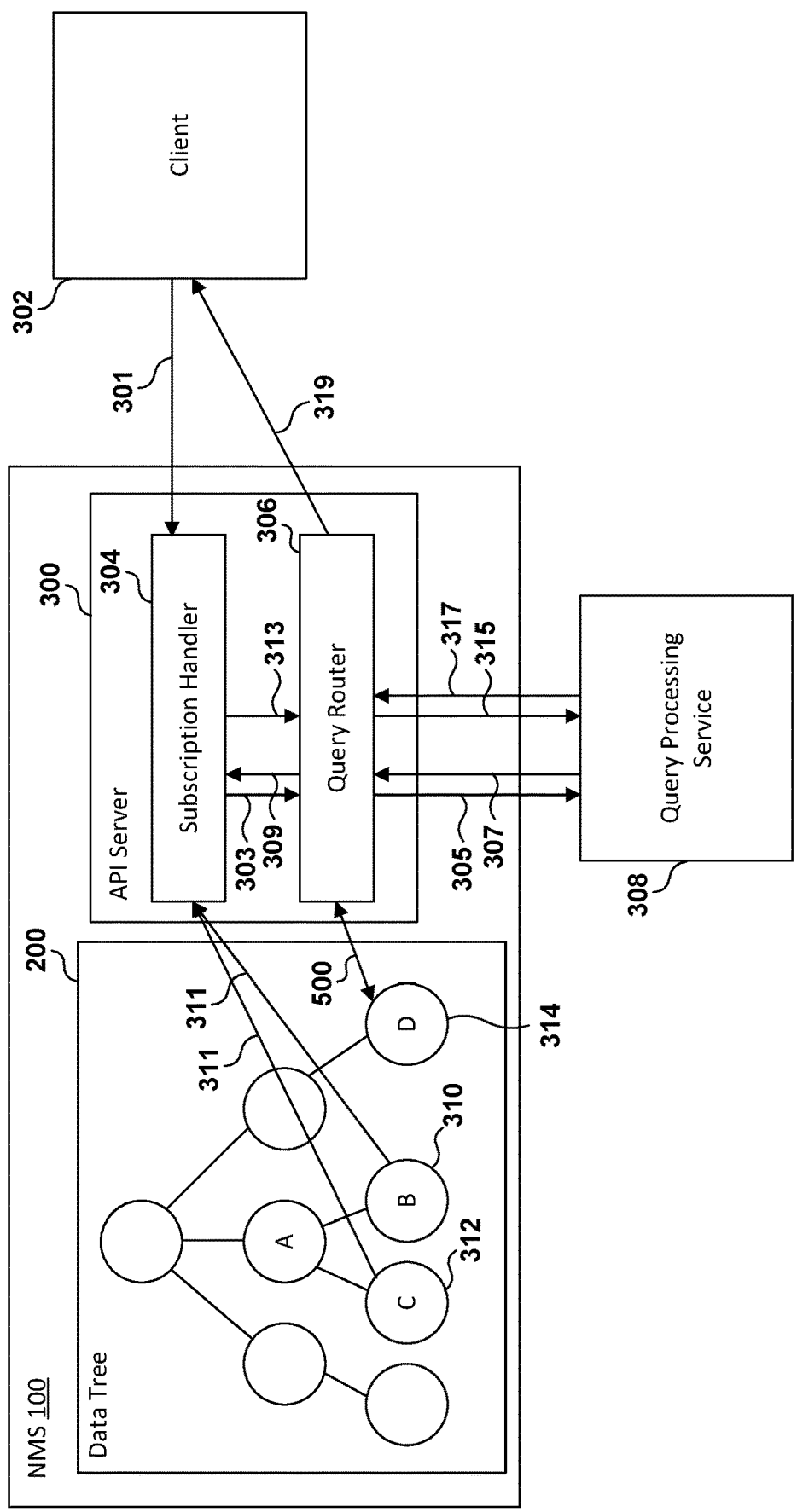
FIG. 5 is a schematic view of an NMS processing and responding to a query embedded within a pathname and storing the result of the query in the data tree, according to various embodiments.

FIG. 5 is a schematic view of NMS 100 processing and responding to a query embedded within a pathname and storing the result of the query in data tree 200, according to various embodiments. FIG. 5 includes similar processes as those shown in FIG. 3. One difference is that when the result of the query is communicated at flow 317 to query router 306, query router 306 creates node D 314 and writes the result of the query at flow 500 to node D 314. In this manner, the result of the query persists in data tree 200. Thus, if client 302 or some other client queries NMS 100 with the same pathname (e.g., /query/difference/A/B) or a different pathname corresponding to the same query (e.g., /query/difference/nodes[A, B]), the subscription handler may directly read node D 314 for the result of the query instead of handing it to query processing service 308 via query router 306.

In various embodiments, in addition to writing the result of the query to data tree 200, query router 306 sends a SUBSCRIBE response message to client 302 including the pathname and the result of the query. Moreover, query router 306 may be responsible for subscribing client 302 to node D 314 such that client 302 is provided with recurring updates of subsequent changes to node D 314.

In certain other embodiments, once the result of the query is written to the data tree 200, subscription handler 304 reads the value associated with node D 314 and communicates the subscription response to client 302. In these embodiments, subscription handler 304 may be responsible for subscribing client 302 to node D 314 such that client 302 is provided with recurring updates of changes to node D 314.

In various embodiments, node D 314 is created within data tree 200 according to the pathname with the embedded query. In the present example, the pathname identifying node D 314 may be/query/difference/A/B, which is the same as the pathname specified in the SUBSCRIBE request message with the embedded pathname. Therefore, node D 314 would be created by creating node "B" as a child of node "A," where node A is a child of node "difference," where node "difference" is a child of node "query," and where node "query" is a child of the root node. Thus, in at least some embodiments, the pathname serves the functions of (1) embedding the query and (2) specifying the path that reflects the hierarchical structure between the root node and the node at which the result of the query is to be held. In addition to this dual function, the pathname also conforms to path-based semantics defined by the protocol used to access data in data tree 200, for example.

Figure 6:
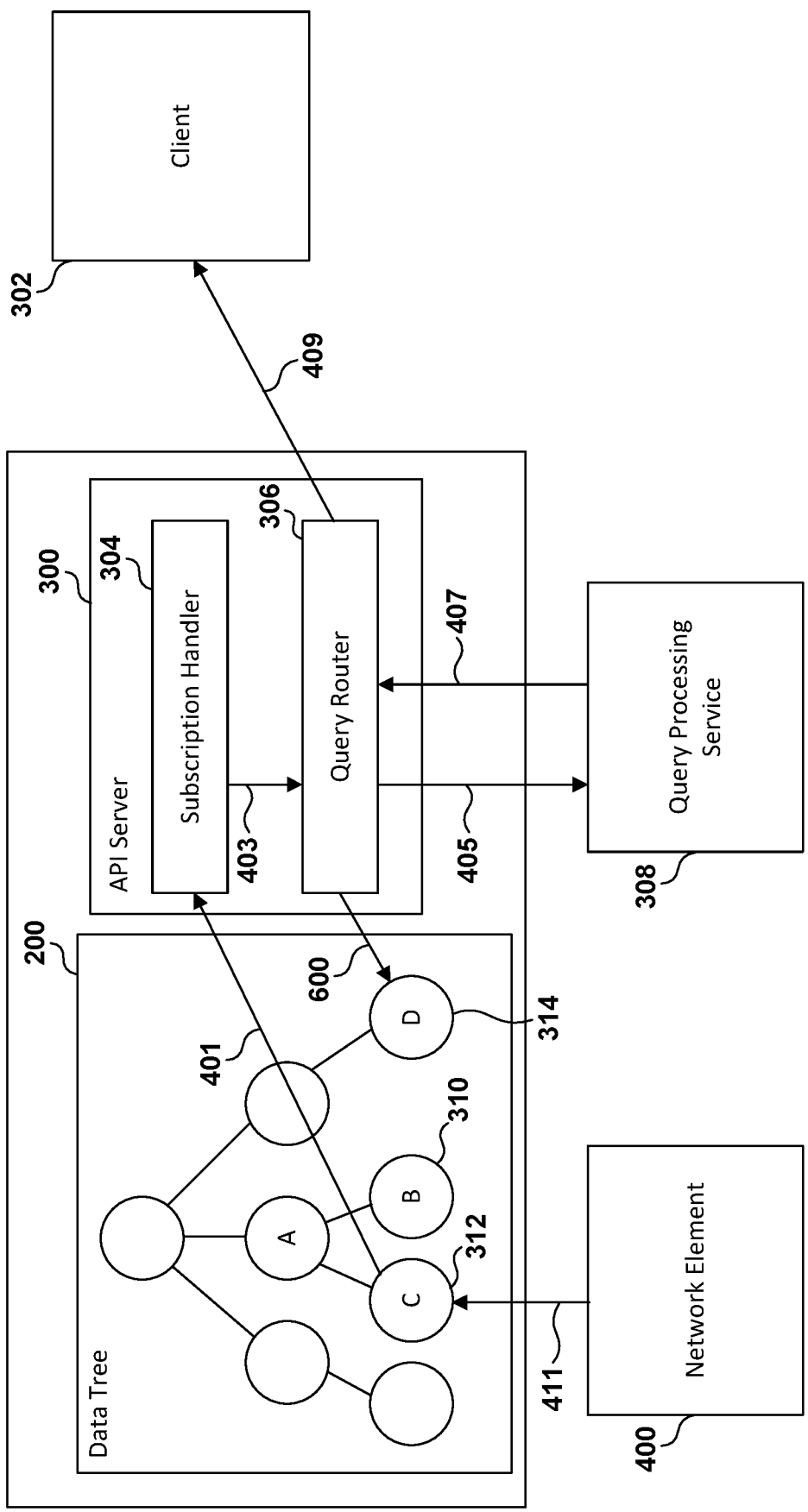
FIG. 6 is a schematic view of an NMS providing a client with an update to the result of the query based on changes to the data tree, according to various embodiments.

FIG. 6 is a schematic view of NMS 100 providing client 302 with an update to the result of the query based on a change to data tree 200, according to various embodiments. Similar to the embodiment of FIG. 4, node C 312 represents configuration or operation state information of network element 400 (e.g., traffic). Network element 400 updates NMS 100 of state change information at flow 411. NMS 100 in turn updates the value of node C 312 in data tree 200, for example. In certain embodiments, if clients are subscribed to node C 312, subscription handler 304 may send an update message to those clients notifying them of the updated value of node C 312. Here, query processing service 308 is subscribed to node C 312 via the subscription handler 304. For example, when query processing service 308 obtained the value associated with node C 312 via subscription handler 304, it may have also requested that subscription handler 304 subscribe it to node C 312. In any case, when node C 312 is updated to an updated value, subscription handler 304 reads the updated value at flow 401 and communicates the updated value in an update message to query processing service 308 at flows 403 and 405 via query router 306.

In certain embodiments, when the updated value is received by query processing service 308, query processing service 308 recalculates the result of the query by executing the query command using the updated value associated with node C 312. In various embodiments, this recalculation generates an updated result of the query.

In certain embodiments, the updated result of the query is communicated at flow 407 to query router 306, which then writes the updated query result to node D 314. In certain embodiments, query router 306 next sends an update message to the client at communication 409. In various embodiments, the update message includes the pathname as specified in the SUBSCRIBE message along with the updated result of the query. In certain other embodiments, once the result of the query is written to data tree 200, subscription handler 304 reads the value associated with node D 314 and communicates the update message to client 302.

Figure 7:
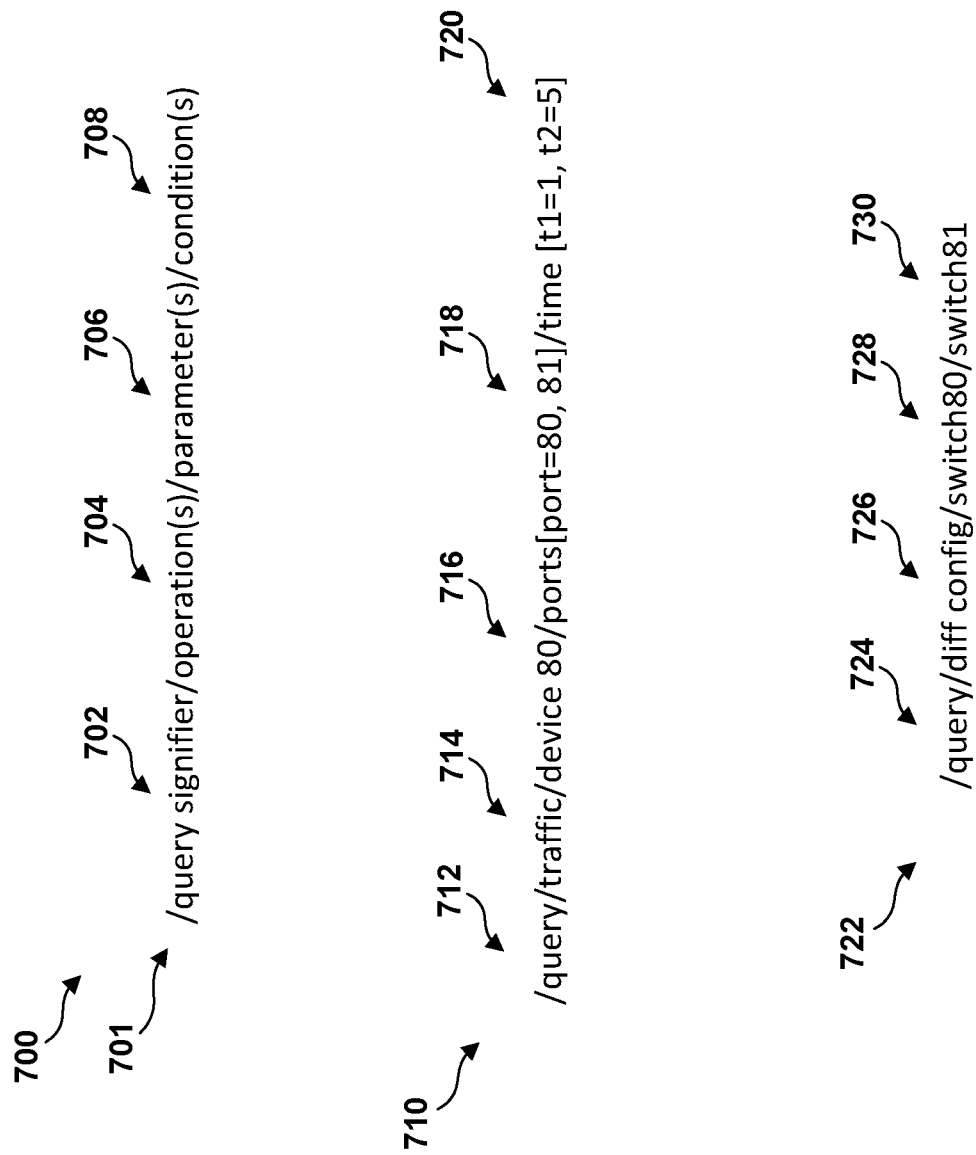
FIG. 7 illustrates examples of pathname conventions used to embed queries in pathnames, according to various embodiments.

FIG. 7 illustrates pathname conventions used to embed queries in pathnames, according to various embodiments. Pathname 700 of FIG. 7 denotes the basic components of a pathname with an embedded query, according to some embodiments. Generally, each pathname comprises an ordered list of pathname elements 701, the pathname elements 701 separated by some notation (e.g., a slash, a colon, a comma, etc.). Pathname 700 begins with the root node and concludes with the most specific path element, for example. Within the ordered list of pathname elements 701, a preceding pathname element is a parent of an immediately succeeding pathname element and the immediately succeeding pathname element is a child of the immediately preceding pathname element. For example, query signifier 702 is parent of the operation(s) 704 and operation(s) 704 is a child of query signifier 702. Pathname 700 comprises four components arranged in an ordered list, for example. In the example shown, the first pathname element is query signifier 702. In some embodiments, query signifier 702 may indicate to the subscription handler 304 that the pathname embeds a query. In other embodiments, query signifier 702 need not be used as subscription handler 304 may be able to determine that the pathname embeds a query based on other pathname elements.

According to the example shown, operation(s) 704 may include one or more operations to be performed on data in the data tree (e.g., one or more nodes). In some embodiments, the operation can include a get difference operation, a traffic counter, a select statement, an operator, a built-in function, a user-defined function, or some other operation.

In the embodiment shown, pathname 700 further includes parameter(s) 706 for specifying one or more parameters. In some embodiments, the one or more parameters relate to the data (e.g., the nodes) upon which the operation is to be performed. For example, the particular data centers, racks, network elements, clusters, ports, or times may be specified by parameter(s) 706. Parameter(s) 706 may itself include two or more parameters that may be separated by a slash symbol or other notation.

Pathname 700 is also shown to include condition(s) 708, which may include one or more conditions used to process the query. For example, conditions can include a where clause, a conditional clause, an if-then-else statement, a comparison operator (e.g., traffic is greater than 100), or some other entity that conditions whether or how the operation is performed on the nodes specified in parameter(s) 706.

Although the example pathname 700 is shown in a certain order, it should be appreciated that other orders of pathname elements 701 may be used without departing from the scope and spirit of the present embodiments.

Also shown in FIG. 7 is another example pathname 710 with the embedded query requesting all traffic passing through ports 80 and 81 of device 80 between times 1 and 5. Pathname 710 includes query signifier 702 comprising the string "query," although some other query signifier may be used or none at all. Pathname 710 is also shown to include operator 714 that aggregates network traffic (e.g., number of packets) flowing through some specified entity. Further, pathname 710 is shown to include parameter 718 identifying the ports of interest. Finally, pathname 710 is shown to include parameter 720 identifying the time period of interest.

In another example, pathname 722 embeds a query requesting the difference (e.g., diff) in configuration between switches 80 and 81. Pathname 722 is shown to include query signifier 724, operator 726, first parameter 728 specifying a first switch (e.g., switch 80) to be compared, and second parameter 730 specifying a second switch (e.g., switch 81) to be compared.

Figure 8:
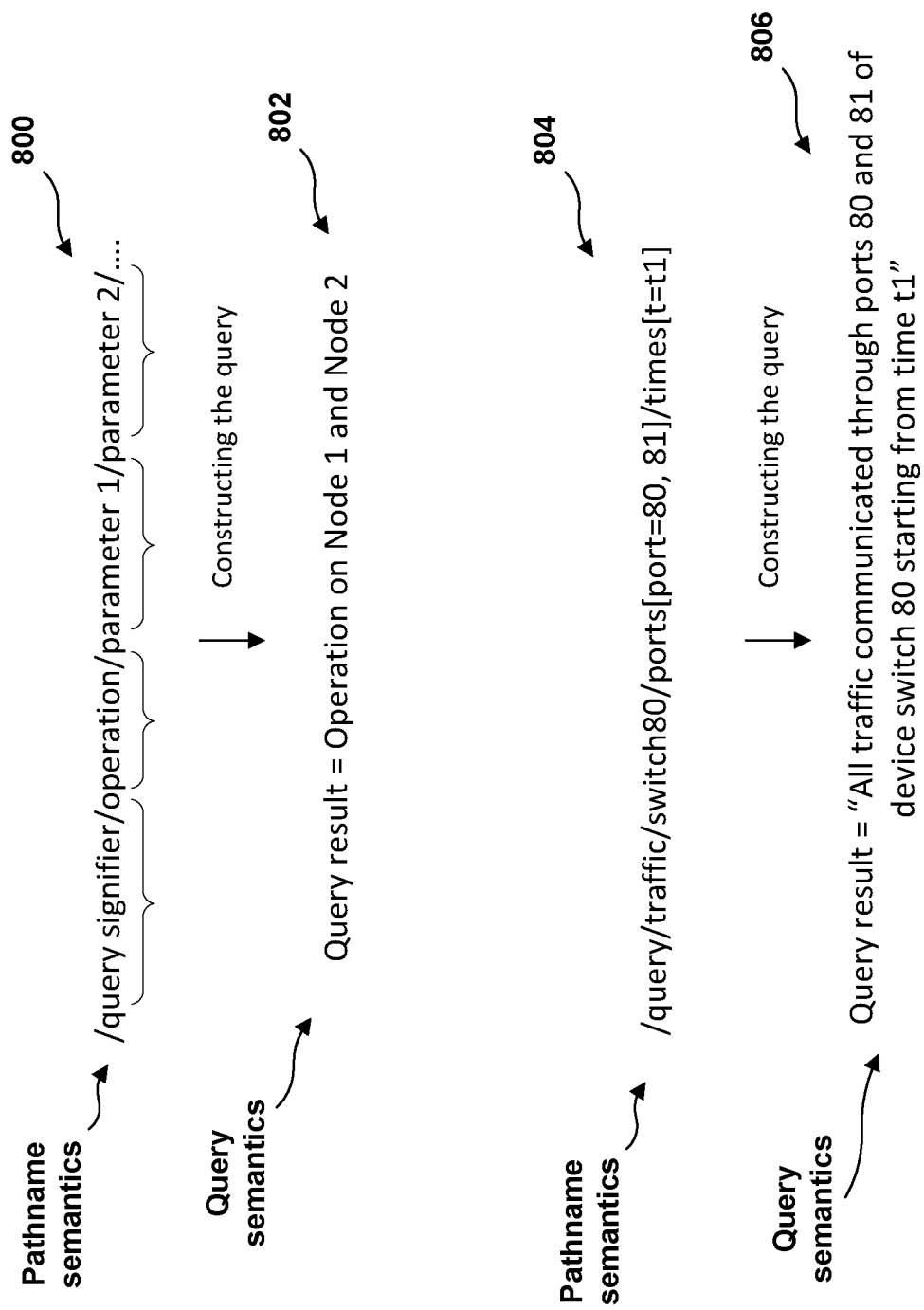
FIG. 8 illustrates example pathname semantics and corresponding query semantics, according to some embodiments.

FIG. 8 illustrates example pathname semantics and corresponding query semantics, according to some embodiments. The process of constructing queries in query semantics from queries in pathname semantics may be implemented by query processing service 308 in some embodiments. In other embodiments, API server 300 may handle construction of queries. According to the embodiment shown, pathname 800 includes a query signifier, an operation, parameter 1, and parameter 2. Pathname 800 thus embeds a query in pathname semantics, for example. However, in some embodiments, pathname 800 is converted to a query command in query semantics before query processing service 308 can process it. In various embodiments, the query in query semantics may be referred to as a query command or a query script, whereas the query in pathname semantics may be referred to as an embedded query, a query embedded in a pathname, or a query encoded in a pathname.

In the embodiment shown, pathname 800 has been used to construct the query command requesting the performance of the operation on Node 1 and Node 2. The process of constructing the query thus includes interpreting the operation to be performed and determining that Nodes 1 and 2 are the nodes in the data tree upon which the operation is to be performed. For example, Nodes 1 and 2 may be determined from parameter 1 and parameter 2.

Continuing with FIG. 8, pathname 804 is used to construct query command 806 requesting "All traffic communicated through ports 80 and 81 of switch 80 starting from t1." In this example, the process of constructing the query may entail identifying the operation to be performed, e.g., traffic. Additionally, the process of constructing the query may involve determining the nodes on which to perform the operation, e.g., /switch80/port80/time[t=t1] and /switch80/port81/time[t=t1].

Figure 9:
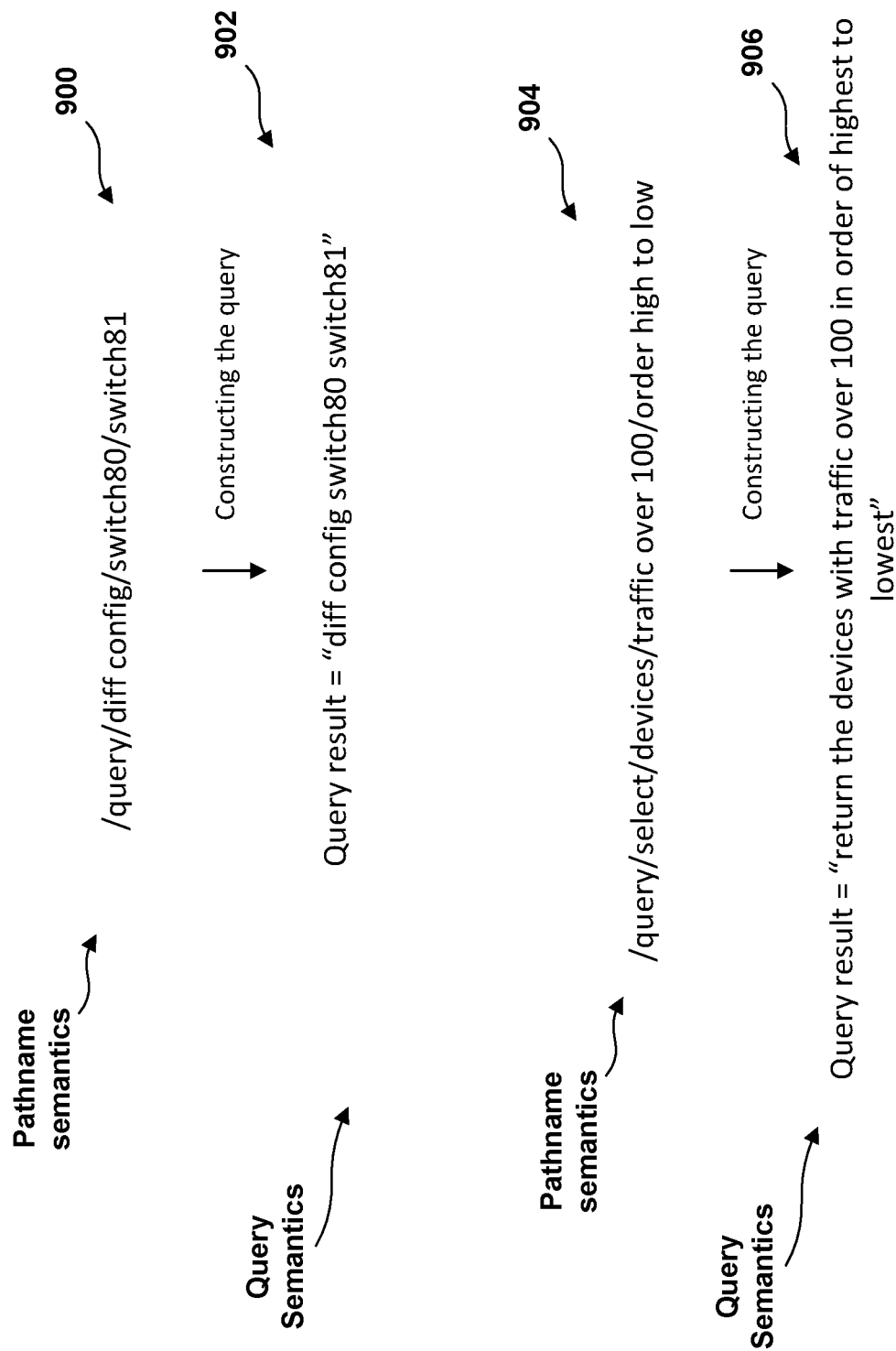
FIG. 9 shows additional examples of pathname semantics and corresponding query semantics, according to some embodiments.

FIG. 9 shows additional examples of pathname semantics and corresponding query semantics, according to some embodiments. Pathname 900 is shown to include a query signifier "query," an operation "diff config," a first parameter "switch80," and a second parameter "switch81." The resulting query command 902 is shown to be "diff config switch80 switch81." Continuing with FIG. 9, pathname 904 includes a query signifier "query," an operation "select," a parameter "devices," a condition "traffic over 100," and a condition "order high to low." The corresponding query command 906 is shown to be "return the devices with traffic over 100 in order of highest to lowest."

Figure 10:
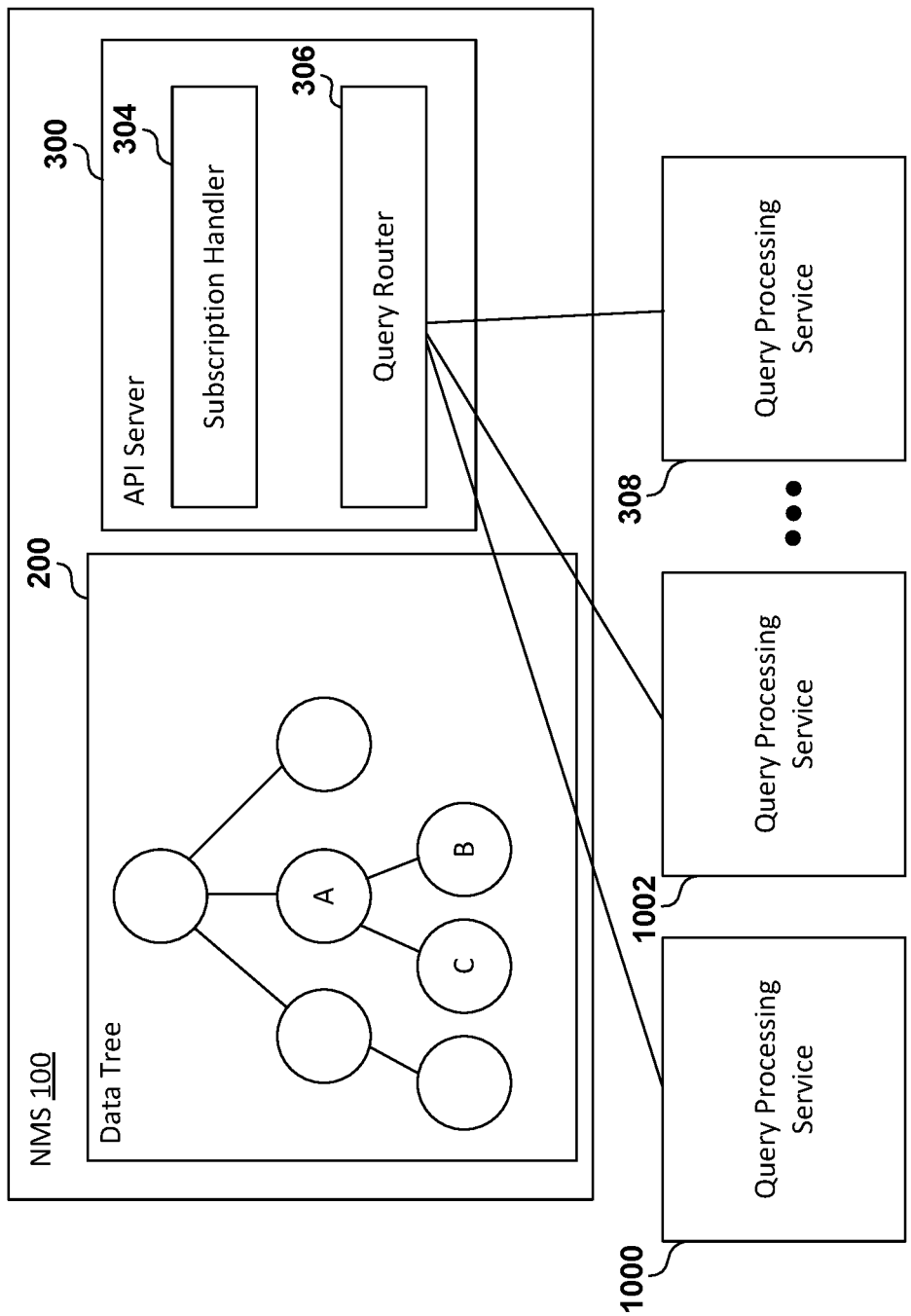
FIG. 10 illustrates a registration process in which a plurality of query processing services registers with a query router to inform the query router of how to route queries, according to various embodiments.

FIG. 10 illustrates a registration process in which a plurality of query processing services 308, 1000, and 1002 registers with query router 306 to inform query router 306 of how to route queries, according to various embodiments. In one example, the plurality of query processing services 308, 1000, and 1002 registers with query router 306 with the pathnames it handles. The plurality of query processing services 308, 1000, and 1002 may, for example, notify query router 306 of a set of path prefixes (e.g., /query/traffic, or/query/diff config, or /query/select, etc.). In this manner, when a pathname with an embedded query contains a particular prefix registered by a particular query processing service, query router 306 may then route the pathname to that particular query processing service. For example, if query processing service 1000 registers at query router 306 with the prefix/query/traffic, and the query router 306 subsequently receives a pathname or a SUBSCRIBE message with a pathname having the prefix/query/traffic, then query router 306 would route the pathname or SUBSCRIBE message with the pathname to query processing service 1000 for generating the result of the query.

Figure 11:
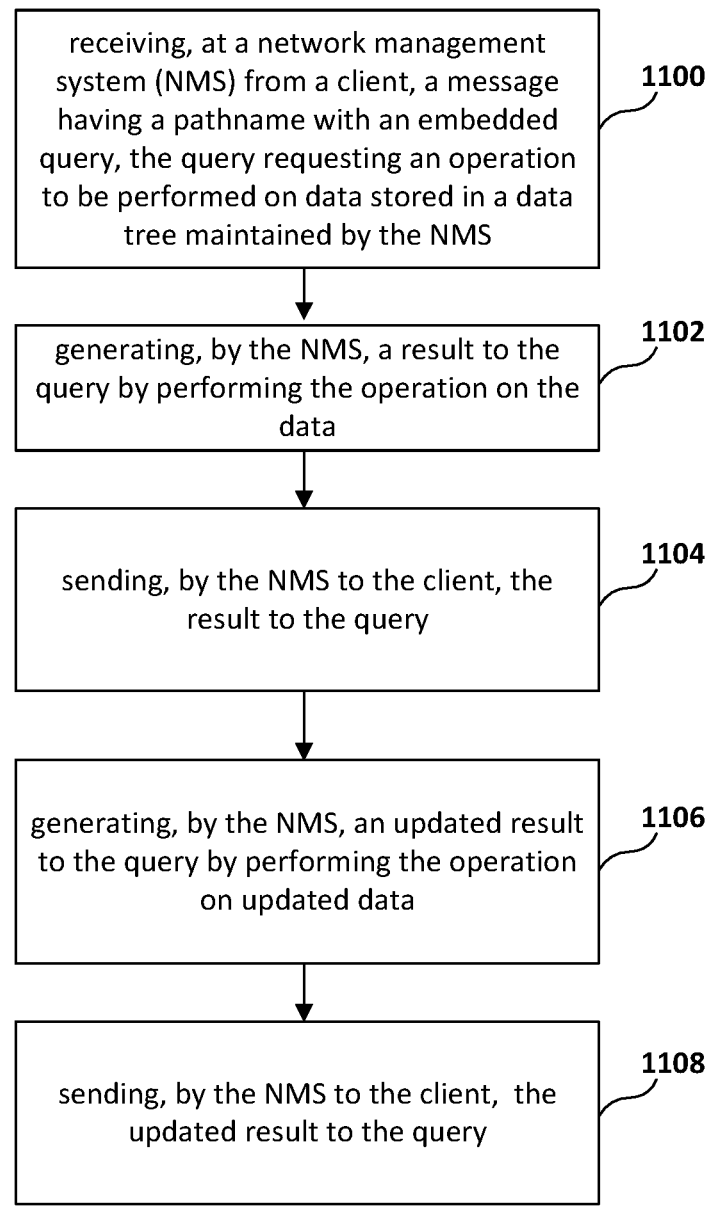
FIG. 11 shows an overall flow of a method that may be used to process and respond to messages having pathnames that embed queries, according to various embodiments.

FIG. 11 shows an overall flow of a method that may be used to process and respond to message having pathnames with embedded queries, according to various embodiments. At block 1100, the method provides for receiving, at a network management system (NMS) from a client, a message having a pathname with an embedded query, the query requesting an operation to be performed on data stored in a data tree maintained by the NMS. In some embodiments, the message may include a data tree transport message such as a remote procedure call (RPC). In some embodiments, the message may be a gRPC network management interface (gNMI) message. At block 1102, the method provides for generating, by the NMS, a result of the query by performing the operation on the data, for example. Block 1102 may be performed by a query processing service of the NMS, for example. At block 1104, the method next provides for sending, by the NMS to the client, the result of the query. At block 1106, the method further provides for generating, by the NMS, an updated result of the query by performing the operation on updated data. As noted above, updated data may occur when the NMS receives configuration or operational state change information from one or more devices (e.g., networking devices). As a result, the result of the query may be updated as well at block 1106. At block 1108, the method provides for sending, by the NMS to the client, the pathname and the updated result of the query. In this manner, the client may be provided with recurring updates of changes to the result of the query. For example, blocks 1106 and 1108 may be repeated such that the client receives updates to changes to the result of the query.

Figure 12:
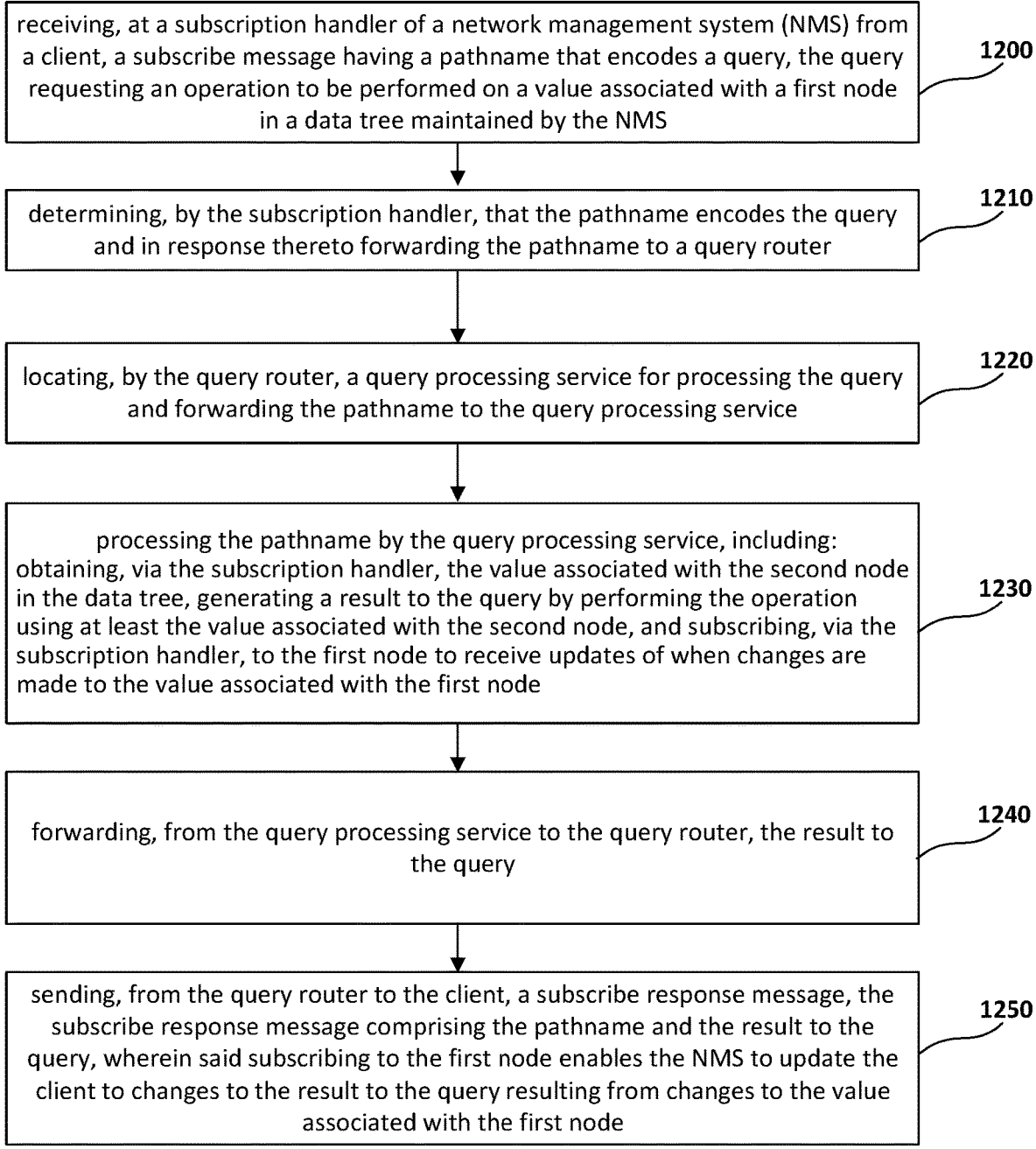
FIG. 12 shows an overall flow of a method that may be used to process and respond to messages having pathnames that embed queries, according to various embodiments.

FIG. 12 shows an overall flow of a method that may be used to process and respond to messages having pathnames with embedded queries, according to various embodiments. At block 1200, the method provides for receiving, at a subscription handler of a network management system (NMS) from a client, a SUBSCRIBE message having a pathname that encodes a query, the query requesting an operation to be performed on a value associated with a first node in a data tree maintained by the NMS. In various embodiments, the first node may be specified using parameters and conditions noted above. That is, for example, the query need not specify the node explicitly using the pathname corresponding to the first node, although in other embodiments the pathname corresponding to the first node may be used. Next, the method provides for determining, by the subscription handler, that the pathname encodes the query and in response thereto forwarding the pathname to a query router. If, for example, the pathname does not embed a query, the subscription handler may read the value associated with the pathname directly from the data tree. Instead, if the pathname embeds a query, the method at block 1210 determines so and forwards the pathname to the query processing service.

At block 1220, the method further provides for locating, by the query router, a query processing service for processing the query and forwarding the pathname to the query processing service. Next, at block 1230, the method includes processing the pathname by the query processing service, including: obtaining, via the subscription handler, the value associated with the second node in the data tree, generating a result of the query by performing the operation using at least the value associated with the second node, and subscribing, via the subscription handler, to the first node to receive updates of when changes are made to the value associated with the first node. In the example shown, the method moreover provides for forwarding, from the query processing service to the query router, the result of the query at block 1240. Finally, the method at block 1250 provides for sending, from the query router to the client, a SUBSCRIBE response message, the SUBSCRIBE response message comprising the pathname and the result of the query, wherein said subscribing to the first node enables the NMS to update the client with changes to the result of the query resulting from changes to the value associated with the first node.

Figure 13:
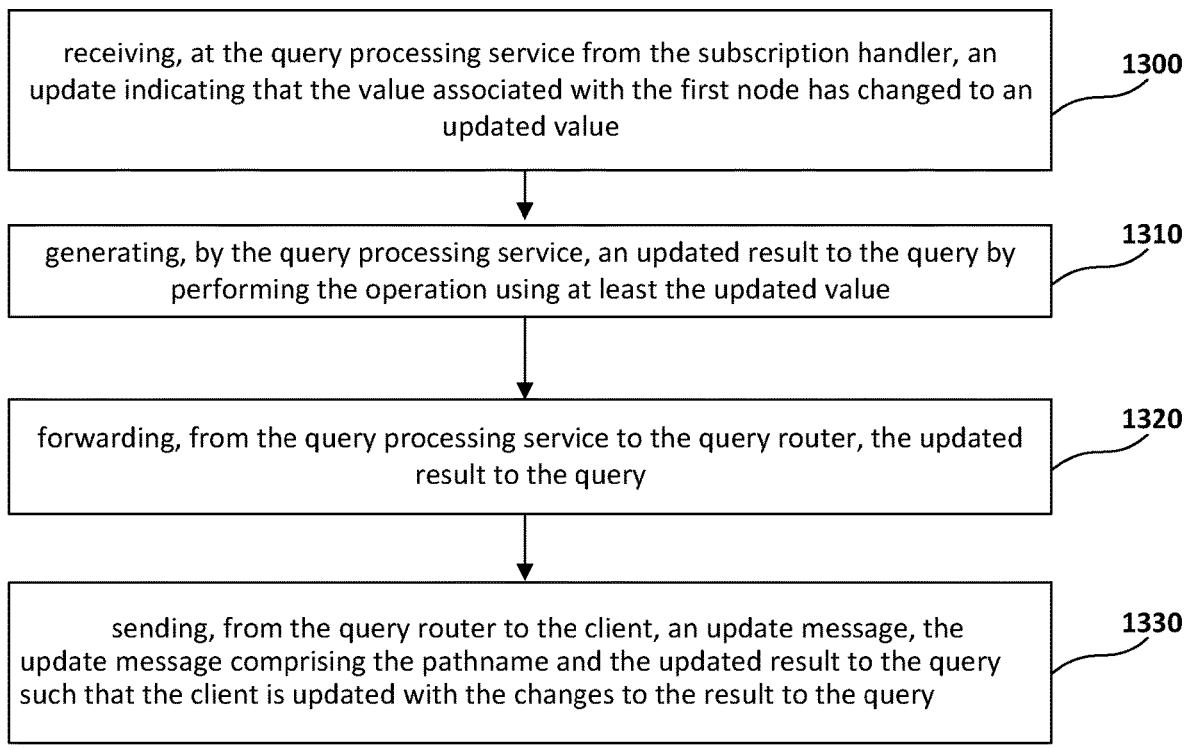
FIG. 13 shows an overall flow of a method that may be used to update a client about changes to the result of a query, according to various embodiments.

FIG. 13 shows an overall flow of a method that may be used to update the client about changes to the result of the query, according to various embodiments. For example, at block 1300, the method provides for receiving, at the query processing service from the subscription handler, an update indicating that the value associated with the first node has changed to an updated value. The update may originate from a networking device whose configuration or operational state has changed. At block 1310, the method includes generating, by the query processing service, an updated result of the query by performing the operation using at least the updated value. At block 1320, the method next provides for forwarding, from the query processing service to the query router, the updated result of the query. Finally, the method provides for sending, from the query router to the client, an update message, the update message comprising the pathname and the updated result of the query such that the client is updated with the changes to the result of the query at block 1330. Blocks 1300-1330 may be repeated as further updates to the value associated with the first node occur. In this manner, the client is provided with recurring updates to changes in the result of the query.

Figure 14:
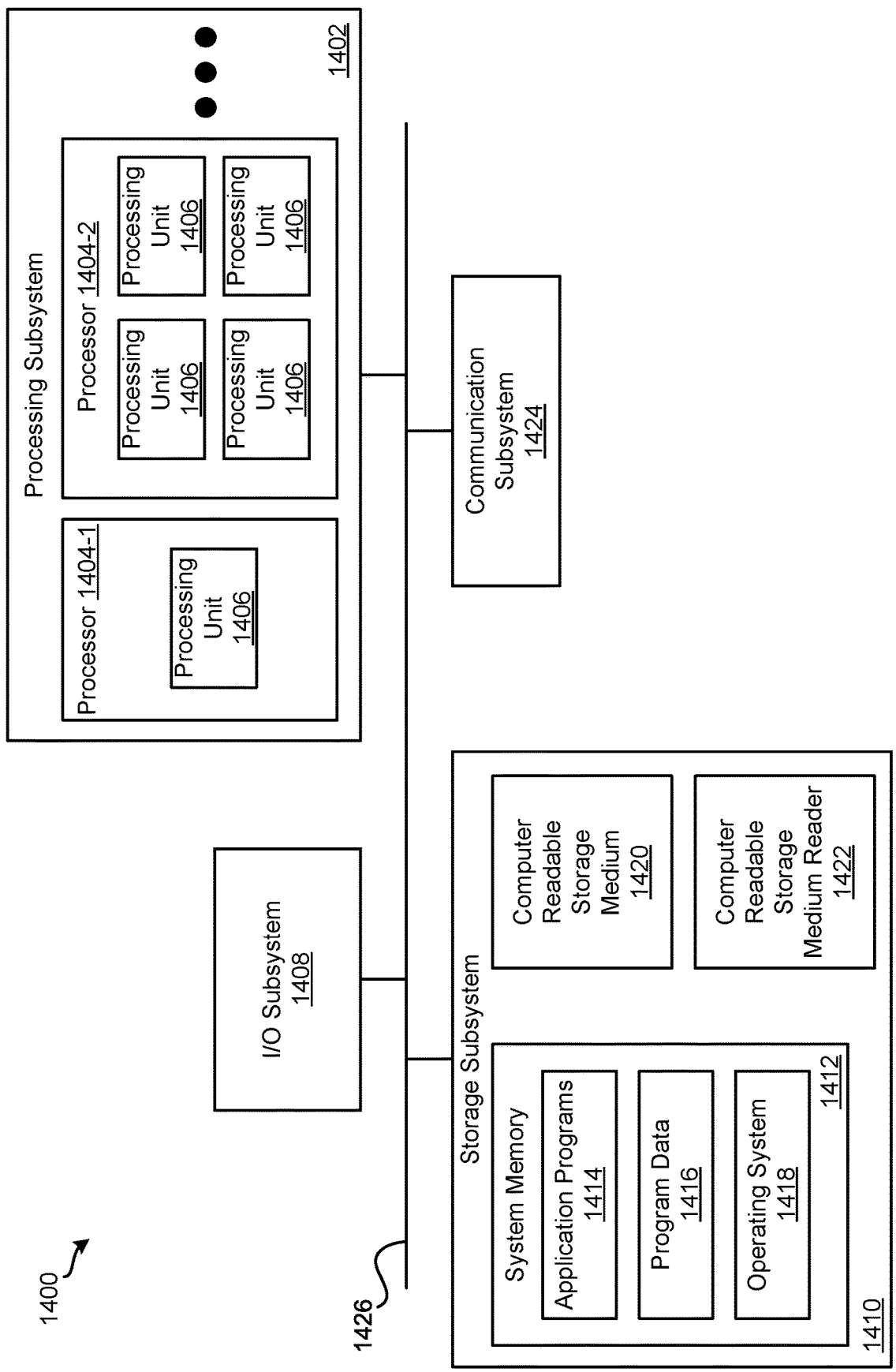
FIG. 14 illustrates an exemplary computer system for implementing various embodiments described above.

FIG. 14 illustrates an exemplary computer system 1400 for implementing various embodiments described above. For example, computer system 1400 may be used to implement network element 102, NMS 100, client 302, and/or query processing service 308. Computer system 1400 may be a desktop computer, a laptop, a server computer, or any other type of computer system or combination thereof. In addition, computer system 1400 can implement many of the operations, methods, and/or processes described above (e.g., methods 1100, 1200, and 1300). As shown in FIG. 14, computer system 1400 includes processing subsystem 1402, which communicates, via bus subsystem 1426, with input/ output (I/O) subsystem 1408, storage subsystem 1410 and communication subsystem 1424.

Bus subsystem 1426 is configured to facilitate communication among the various components and subsystems of computer system 1400. While bus subsystem 1426 is illustrated in FIG. 14 as a single bus, one of ordinary skill in the art will understand that bus subsystem 1426 may be implemented as multiple buses. Bus subsystem 1426 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Extended ISA (EISA) bus, a Video Electronics Standards Association (VESA) local bus, a Peripheral Component Interconnect (PCI) bus, a Universal Serial Bus (USB), etc.

Processing subsystem 1402, which can be implemented as one or more integrated circuits (e.g., a conventional microprocessor or microcontroller), controls the operation of computer system 1400. Processing subsystem 1402 may include one or more processors 1404. Each processor 1404 may include one processing unit 1406 (e.g., a single core processor such as processor 1404-1) or several processing units 1406 (e.g., a multicore processor such as processor 1404-2). In some embodiments, processors 1404 of processing subsystem 1402 may be implemented as independent processors while, in other embodiments, processors 1404 of processing subsystem 1402 may be implemented as multiple processors integrated into a single chip or multiple chips. Still, in some embodiments, processors 1404 of processing subsystem 1402 may be implemented as a combination of independent processors and multiple processors integrated into a single chip or multiple chips.

In some embodiments, processing subsystem 1402 can execute a variety of programs or processes in response to program code and can maintain multiple concurrently executing programs or processes. At any given time, some or all of the program code to be executed can reside in processing subsystem 1402 and/or in storage subsystem 1410. Through suitable programming, processing subsystem 1402 can provide various functionalities, such as the functionalities described above by reference to methods 1100, 1200, 1300, etc.

I/O subsystem 1408 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 1400 to a user or another device (e.g., a printer).

As illustrated in FIG. 14, storage subsystem 1410 includes system memory 1412, computer-readable storage medium 1420, and computer-readable storage medium reader 1422.

System memory 1412 may be configured to store software in the form of program instructions that are loadable and executable by processing subsystem 1402 as well as data generated during the execution of program instructions. In some embodiments, system memory 1412 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 1412 may include different types of memory, such as static random access memory (SRAM) and/or dynamic random access memory (DRAM). System memory 1412 may include a basic input/output system (BIOS), in some embodiments, that is configured to store basic routines to facilitate transferring information between elements within computer system 1400 (e.g., during start-up). Such a BIOS may be stored in ROM (e.g., a ROM chip), flash memory, or any other type of memory that may be configured to store the BIOS.

As shown in FIG. 14, system memory 1412 includes application programs 1414, program data 1416, and operating system (OS) 1418. OS 1418 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems. In one embodiment, OS 1418 includes EOS® available from Arista Networks, Inc., of Santa Clara, Calif., the assignee of the present disclosure.

Computer-readable storage medium 1420 may be a non-transitory computer-readable medium configured to store software (e.g., programs, code modules, data constructs, instructions, etc.). Many of the components (API server 300, subscription handler 304, query router 306 and query processing service 308) and/or processes (e.g., methods 1100, 1200, 1300, etc.) described above may be implemented as software that when executed by a processor or processing unit (e.g., a processor or processing unit of processing subsystem 1402) performs the operations of such components and/or processes. Storage subsystem 1410 may also store data used for, or generated during, the execution of the software.

Storage subsystem 1410 may also include computer-readable storage medium reader 1422 that is configured to communicate with computer-readable storage medium 1420. Together and, optionally, in combination with system memory 1412, computer-readable storage medium 1420 may comprehensively represent remote, local, fixed, and/or removable storage devices plus storage media for temporarily and/or more permanently containing, storing, transmitting, and retrieving computer-readable information.

Computer-readable storage medium 1420 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSDs), flash memory card (e.g., secure digital (SD) cards, CompactFlash cards, etc.), USB flash drives, or any other type of computer-readable storage media or device.

Communication subsystem 1424 serves as an interface for receiving data from, and transmitting data to, other devices, computer systems, and networks. For example, communication subsystem 1424 may allow computer system 1400 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 1424 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 1424 may provide components configured for wired communication (e.g., Ethernet) in addition to or instead of components configured for wireless communication.

One of ordinary skill in the art will realize that the architecture shown in FIG. 14 is only an example architecture of computer system 1400, and that computer system 1400 may have additional or fewer components than shown, or a different configuration of components. The various components shown in FIG. 14 may be implemented in hardware, software, firmware or any combination thereof, including one or more signal processing and/or application specific integrated circuits.

Figure 15:
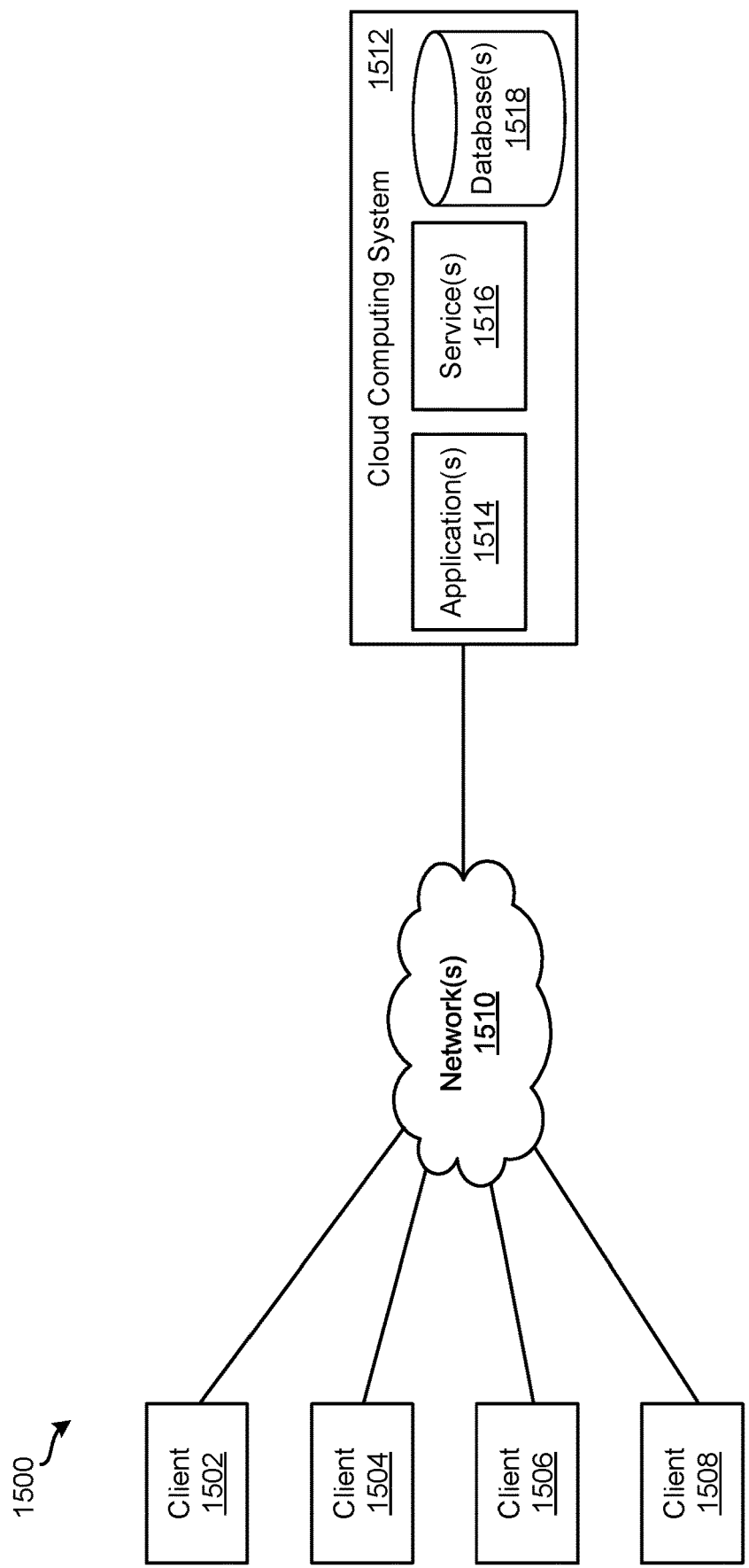
FIG. 15 illustrates an exemplary system for implementing various embodiments described above.

FIG. 15 illustrates an exemplary system 1500 for implementing various embodiments described above. For example, one of client devices 1502-1508 may be used to implement clients 101a-101n, network elements 102a-102n, or client 302 and cloud computing system 1512 may be used to implement NMS 100. As shown, system 1500 includes client devices 1502-1508, one or more networks 1510, and cloud computing system 1512. Cloud computing system 1512 is configured to provide resources and data to client devices 1502-1508 via networks 1510. In some embodiments, cloud computing system 1512 provides resources to any number of different users (e.g., customers, tenants, organizations, etc.). Cloud computing system 1512 may be implemented by one or more computer systems (e.g., servers), virtual machines operating on a computer system, or a combination thereof.

As shown, cloud computing system 1512 includes one or more applications 1514, one or more services 1516, and one or more databases 1518. Cloud computing system 1512 may provide applications 1514, services 1516, and databases 1518 to any number of different customers in a self-service, subscription-based, elastically scalable, reliable, highly available, and secure manner.

Cloud computing system 1512 may provide cloud services via different deployment models. For example, cloud services may be provided under a public cloud model in which cloud computing system 1512 is owned by an organization selling cloud services and the cloud services are made available to the general public or different industry enterprises. As another example, cloud services may be provided under a private cloud model in which cloud computing system 1512 is operated solely for a single organization and may provide cloud services for one or more entities within the organization. The cloud services may also be provided under a community cloud model in which cloud computing system 1512 and the cloud services provided by cloud computing system 1512 are shared by several organizations in a related community. The cloud services may also be provided under a hybrid cloud model, which is a combination of two or more of the aforementioned different models.

In some instances, any one of applications 1514, services 1516, and databases 1518 made available to client devices 1502-1508 via networks 1510 from cloud computing system 1512 is referred to as a "cloud service." Typically, servers and systems that make up cloud computing system 1512 are different from the on-premises servers and systems of a customer. For example, cloud computing system 1512 may host an application and a user of one of client devices 1502-1508 may order and use the application via networks 1510.

Applications 1514 may include software applications that are configured to execute on cloud computing system 1512 (e.g., a computer system or a virtual machine operating on a computer system) and be accessed, controlled, managed, etc. via client devices 1502-1508. In some embodiments, applications 1514 may include server applications and/or mid-tier applications (e.g., HTTP (hypertext transfer protocol) server applications, FTP (file transfer protocol) server applications, CGI (common gateway interface) server applications, JAVA server applications, etc.). Services 1516 are software components, modules, application, etc. that are configured to execute on cloud computing system 1512 and provide functionalities to client devices 1502-1508 via networks 1510. Services 1516 may be web-based services or on-demand cloud services.

Databases 1518 are configured to store and/or manage data that is accessed by applications 1514, services 1516, and/or client devices 1502-1508. For instance, inventory data storage 130 may be stored in databases 1518. Databases 1518 may reside on a non-transitory storage medium local to (and/or resident in) cloud computing system 1512, in a storage-area network (SAN), on a non-transitory storage medium local located remotely from cloud computing system 1512. In some embodiments, databases 1518 may include relational databases that are managed by a relational database management system (RDBMS). Databases 1518 may be a column-oriented databases, row-oriented databases, or a combination thereof. In some embodiments, some or all of databases 1518 are in-memory databases. That is, in some such embodiments, data for databases 1518 are stored and managed in memory (e.g., random access memory (RAM)).

Client devices 1502-1508 are configured to execute and operate a client application (e.g., a web browser, a proprietary client application, etc.) that communicates with applications 1514, services 1516, and/or databases 1518 via networks 1510. This way, client devices 1502-1508 may access the various functionalities provided by applications 1514, services 1516, and databases 1518 while applications 1514, services 1516, and databases 1518 are operating (e.g., hosted) on cloud computing system 1512. Although system 1500 is shown with four client devices, any number of client devices may be supported.

Networks 1510 may be any type of network configured to facilitate data communications among client devices 1502-1508 and cloud computing system 1512 using any of a variety of network protocols. Networks 1510 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

FURTHER EXAMPLES

In accordance with the present disclosure, a method can include receiving, at a subscription handler of a network management system (NMS) from a client, a message having a pathname that encodes a query, the query requesting an operation to be performed on a value associated with a first node in a data tree maintained by the NMS; in response thereto forwarding the pathname to a query router, processing the pathname by a query processing service, including, obtaining, via the subscription handler, the value associated with the first node in the data tree, and generating a result of the query by performing the operation using at least the value associated with the second node; forwarding, from the query processing service to the query router, the result of the query; and sending, from the query router to the client, a response message comprising the pathname and the result of the query.

In some embodiments, the method may further include subscribing, via the subscription handler, to the first node to receive updates of when changes are made to the value associated with the first node, wherein said subscribing to the first node enables the NMS to update the client with changes to the result of the query.

In some embodiments, the method may further include receiving, at the query processing service from the subscription handler, an update indicating that the value associated with the first node has changed to an updated value; generating, by the query processing service, an updated result of the query by performing the operation using at least the updated value; forwarding, from the query processing service to the query router, the updated result of the query; and sending, from the query router to the client, an update message, the update message comprising the pathname and the updated result of the query such that the client is updated with the changes to the result of the query.

In some embodiments, the method may further include creating, by the query router, a second node in the data tree corresponding to the pathname; and writing, by the query router, the result of the query to the second node to store the result in the data tree.

In some embodiments, the method may further include determining, from the pathname, the operation to be performed and a second pathname associated with the second node for obtaining the value associated with the second node in the data tree; and constructing, using the operation and the second pathname, a query command representing the query, wherein the query command is used by the query processing service for said obtaining the value and said generating the result.

In accordance with the present disclosure, a method may include receiving, at a network management system (NMS) from a client, a message having an object reference with an embedded query, the query requesting an operation to be performed on data stored in a data tree maintained by the NMS; generating, by the NMS, a result of the query by performing the operation on the data; and sending, by the NMS to the client, the result of the query.

In some embodiments, the data corresponds to a first node in the data tree maintained by the NMS, wherein said generating the result of the query further comprises reading a value associated with the first node from the data tree and then performing the operation on the value.

In some embodiments, the method may further include generating, by the NMS, an updated result of the query by performing the operation on updated data; and sending, by the NMS to the client, the updated result of the query.

In some embodiments, the method may further include locating a query processing service for processing the query and forwarding the object reference to the query processing service, wherein said generating the result of the query is performed by the query processing service.

In some embodiments, the method may further include: creating, by the NMS, a node in the data tree maintained by the NMS; and writing, by the NMS, the result of the query to the node to store the result in the data tree.

In some embodiments, the object reference comprises an ordered list of elements, each element corresponding to a node in the data tree.

In some embodiments, a first parameter of the query is specified in a first element of the ordered list of elements and a second parameter of the query is specified in a second element of the ordered list of elements.

In some embodiments, the first parameter and the second parameter of the query are one of an operator, a function, an attribute, a time parameter, a data center identifier, a rack identifier, a network element identifier, a line card identifier, a port identifier, or a subquery.

In some embodiments, the operation is a difference in configuration operation, a traffic counting operation, a select operation, a filter operation, a projection operation, an aggregation operation, a sort operation, a search operation, or a match operation.

In some embodiments, the object reference is a pathname.

In accordance with the present disclosure, a system may include a set of processing units; and a non-transitory machine-readable medium storing instructions that when executed by at least one processing unit in the set of processing units cause the at least one processing unit to receive, at a network management system (NMS) from a client, a message having an object reference with an embedded query, the query requesting an operation to be performed on data stored in a data tree maintained by the NMS; generate, by the NMS, a result of the query by performing the operation on the data; and send, by the NMS to the client, the result of the query in a second data tree transport message.

In some embodiments, the non-transitory machine-readable may further include instructions to cause the at least one processing unit to generate, by the NMS, an updated result of the query by performing the operation on updated data; and send, by the NMS to the client, the updated result of the query.

In some embodiments, the non-transitory machine-readable further includes instructions to cause the at least one processing unit to create, by the NMS, a node in the data tree maintained by the NMS; and write, by the NMS, the result of the query to the node to store the result in the data tree.

In some embodiments, the object reference comprises an ordered list of elements, each element corresponding to a node in the data tree.

In some embodiments, a first parameter of the query is specified in a first element of the ordered list of elements and a second parameter of the query is specified in a second element of the ordered list of elements.

In some embodiments, the first parameter and the second parameter of the query are one of an operator, a function, an attribute, a time parameter, a data center identifier, a rack identifier, a network element identifier, a line card identifier, a port identifier, or a subquery.

In some embodiments, the operation is a difference in configuration operation, a traffic counting operation, a select operation, a filter operation, a projection operation, an aggregation operation, a sort operation, a search operation, or a match operation.

In some embodiments, the object reference is a pathname.

In accordance with the present disclosure, a non-transitory machine-readable medium may store a program executable by at least one processing unit of a device. The program may include sets of instructions for receiving, at a network management system (NMS) from a client, a message having an object reference with an embedded query, the query requesting an operation to be performed on data stored in a data tree maintained by the NMS; generating, by the NMS, a result of the query by performing the operation on the data; and sending, by the NMS to the client, the result of the query.

In some embodiments, the program may further comprise instructions for generating, by the NMS, an updated result of the query by performing the operation on updated data; and sending, by the NMS to the client, the updated result of the query.

In some embodiments, the program may further comprise instructions for creating, by the NMS, a node in the data tree maintained by the NMS; and writing, by the NMS, the result of the query to the node to store the result in the data tree.

In some embodiments, the operation is a difference in configuration operation, a traffic counting operation, a select operation, a filter operation, a projection operation, an aggregation operation, a sort operation, a search operation, or a match operation.

In some embodiments, the object reference is a pathname.

What is claimed is:

1. A computer-implemented method, comprising:
   receiving, at a subscription handler of a network management system (NMS) configured to manage a plurality of network devices in a network, a message from a client having a pathname that encodes a query for information associated with a network device in the plurality of network devices, the query requesting an operation to be performed on a value associated with a first node in a data tree maintained by the NMS, wherein the data tree is organized in a manner that reflects the arrangement of the plurality of network elements in the network;
   in response thereto forwarding the pathname to a query router;
   processing the pathname by a query processing service, including:
      obtaining, via the subscription handler, the value associated with the first node in the data tree, and
      generating a result of the query by performing the operation using at least the value associated with the first node;
   forwarding, from the query processing service to the query router, the result of the query; and
   sending, from the query router to the client, a response message comprising the pathname and the result of the query.

2. The computer-implemented method of claim 1, further comprising:
   subscribing, via the subscription handler, to the first node to receive updates of when changes are made to the value associated with the first node, wherein said subscribing to the first node enables the NMS to update the client with changes to the result of the query.

3. The computer-implemented method of claim 2, further comprising:
   receiving, at the query processing service from the subscription handler, an update indicating that the value associated with the first node has changed to an updated value;
   generating, by the query processing service, an updated result of the query by performing the operation using at least the updated value;
   forwarding, from the query processing service to the query router, the updated result of the query; and
   sending, from the query router to the client, an update message, the update message comprising the pathname and the updated result of the query such that the client is updated with the changes to the result of the query.

4. The computer-implemented method of claim 1, further comprising:
   creating, by the query router, a second node in the data tree corresponding to the pathname; and
   writing, by the query router, the result of the query to the second node to store the result in the data tree.

5. The computer-implemented method of claim 1, wherein said processing the pathname by the query processing service further comprises:
   determining, from the pathname, the operation to be performed and a second pathname associated with the second node for obtaining the value associated with the second node in the data tree; and
   constructing, using the operation and the second pathname, a query command representing the query, wherein the query command is used by the query processing service for said obtaining the value and said generating the result.

6. A method, comprising:
   receiving, at a network management system (NMS) configured to manage a plurality of network devices in a network, a message from a client having an object reference with an embedded query for information associated with a network device in the plurality of network devices, the embedded query requesting an operation to be performed on data stored in a data tree maintained by the NMS, wherein the data tree is organized in a manner that reflects the arrangement of the plurality of network elements in the network;
   generating, by the NMS, a result of the embedded query by performing the operation on the data; and
   sending, by the NMS to the client, the result of the embedded query.

7. The method of claim 6, wherein the data corresponds to a first node in the data tree maintained by the NMS, wherein said generating the result of the embedded query further comprises reading a value associated with the first node from the data tree and then performing the operation on the value.

8. The method of claim 6, further comprising:
generating, by the NMS, an updated result of the embedded query by performing the operation on updated data; and
sending, by the NMS to the client, the updated result of the embedded query.

9. The method of claim 6, further comprising:
locating a query processing service for processing the embedded query and forwarding the object reference to the query processing service, wherein said generating the result of the embedded query is performed by the query processing service.

10. The method of claim 6, further comprising:
creating, by the NMS, a node in the data tree maintained by the NMS; and
writing, by the NMS, the result of the embedded query to the node to store the result in the data tree.

11. The method of claim 6, wherein the object reference comprises an ordered list of elements, each element corresponding to a node in the data tree.

12. The method of claim 11, wherein a first parameter of the embedded query is specified in a first element of the ordered list of elements and a second parameter of the embedded query is specified in a second element of the ordered list of elements.

13. The method of claim 12, wherein the first parameter and the second parameter of the embedded query are one of an operator, a function, an attribute, a time parameter, a data center identifier, a rack identifier, a network element identifier, a line card identifier, a port identifier, or a subquery.

14. The method of claim 6, wherein the operation is a difference in configuration operation, a traffic counting operation, a select operation, a filter operation, a projection operation, an aggregation operation, a sort operation, a search operation, or a match operation.

15. The method of claim 6, wherein the object reference is a pathname.

16. A system comprising:
a set of processing units; and
a non-transitory machine-readable medium storing instructions that when executed by at least one processing unit in the set of processing units cause the at least one processing unit to:
receive, at a network management system (NMS) configured to manage a plurality of network devices in a network, a first data tree transport message from a client having an object reference with an embedded query for information associated with a network device in the plurality of network devices, the embedded query requesting an operation to be performed on data stored in a data tree maintained by the NMS, wherein the data tree is organized in a manner that reflects the arrangement of the plurality of network elements in the network;
generate, by the NMS, a result of the embedded query by performing the operation on the data; and
send, by the NMS to the client, the result of the embedded query in a second data tree transport message.

17. The system of claim 16, wherein the non-transitory machine-readable further includes instructions to cause the at least one processing unit to:
generate, by the NMS, an updated result of the embedded query by performing the operation on updated data; and
send, by the NMS to the client, the updated result of the embedded query.

18. The system of claim 16, wherein the non-transitory machine-readable further includes instructions to cause the at least one processing unit to:
create, by the NMS, a node in the data tree maintained by the NMS; and
write, by the NMS, the result of the embedded query to the node to store the result in the data tree.

19. The system of claim 16, wherein the object reference comprises an ordered list of elements, each element corresponding to a node in the data tree.

20. The system of claim 19, wherein a first parameter of the embedded query is specified in a first element of the ordered list of elements and a second parameter of the embedded query is specified in a second element of the ordered list of elements.

21. The system of claim 20, wherein the first parameter and the second parameter of the embedded query are one of an operator, a function, an attribute, a time parameter, a data center identifier, a rack identifier, a network element identifier, a line card identifier, a port identifier, or a subquery.

22. The system of claim 16, wherein the operation is a difference in configuration operation, a traffic counting operation, a select operation, a filter operation, a projection operation, an aggregation operation, a sort operation, a search operation, or a match operation.

23. The system of claim 16, wherein the object reference is a pathname.

24. A non-transitory machine-readable medium storing a program executable by at least one processing unit of a device, the program comprising sets of instructions for:
receiving, at a network management system (NMS) configured to manage a plurality of network devices in a network, a message from a client having an object reference with an embedded query for information associated with a network device in the plurality of network devices, the embedded query requesting an operation to be performed on data stored in a data tree maintained by the NMS, wherein the data tree is organized in a manner that reflects the arrangement of the plurality of network elements in the network;
generating, by the NMS, a result of the embedded query by performing the operation on the data; and
sending, by the NMS to the client, the result of the embedded query.

25. The non-transitory machine-readable medium of claim 24, further comprising instructions for:
generating, by the NMS, an updated result of the embedded query by performing the operation on updated data; and
sending, by the NMS to the client, the updated result of the embedded query.

26. The non-transitory machine-readable medium of claim 24, further comprising instructions for:
creating, by the NMS, a node in the data tree maintained by the NMS; and
writing, by the NMS, the result of the embedded query to the node to store the result in the data tree.

27. The non-transitory machine-readable medium of claim 24, wherein the operation is a difference in configuration operation, a traffic counting operation, a select operation, a filter operation, a projection operation, an aggregation operation, a sort operation, a search operation, or a match operation.

28. The non-transitory machine-readable medium of claim 24, wherein the object reference is a pathname.

* * * * *